United States Patent
Lee

(10) Patent No.: US 9,129,546 B2
(45) Date of Patent: Sep. 8, 2015

(54) ELECTRONIC DEVICE AND METHOD FOR CHANGING SETTING VALUE

(71) Applicant: Samsung Electronics Co. Ltd., Suwon-si, Gyeonggi-do (KR)

(72) Inventor: Chang-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 13/974,518

(22) Filed: Aug. 23, 2013

(65) Prior Publication Data

US 2014/0132531 A1 May 15, 2014

(30) Foreign Application Priority Data

Nov. 12, 2012 (KR) .................... 10-2012-0127440

(51) Int. Cl.
*G06F 3/041* (2006.01)
*G09G 5/00* (2006.01)
*G06F 3/0488* (2013.01)
*G06F 3/0484* (2013.01)
*G06F 3/01* (2006.01)

(52) U.S. Cl.
CPC .............. *G09G 5/006* (2013.01); *G06F 3/01* (2013.01); *G06F 3/04847* (2013.01); *G06F 3/04883* (2013.01)

(58) Field of Classification Search
CPC ............ G06F 3/04883; G06F 3/04847; G06F 3/0488; G06F 3/0482; G06F 3/04886; G06F 3/04817; G06F 3/0485; G06F 9/4443; G06F 2203/04803; G06F 2203/04806; G06F 2203/04809; H04M 1/72519; A61M 2205/502; A61M 2205/505
USPC .......... 345/156, 173; 715/863, 702, 810, 773, 715/779, 700, 716, 735, 835, 977
See application file for complete search history.

(56) References Cited

U.S. PATENT DOCUMENTS

| | | | |
|---|---|---|---|
| 8,473,871 B1* | 6/2013 | Sandler et al. | 715/863 |
| 8,510,238 B1* | 8/2013 | Aradhye et al. | 706/12 |
| 2006/0166678 A1 | 7/2006 | Karaoguz et al. | |
| 2008/0122796 A1* | 5/2008 | Jobs et al. | 345/173 |
| 2009/0153495 A1 | 6/2009 | Chen et al. | |
| 2011/0175723 A1 | 7/2011 | Ko et al. | |
| 2013/0061180 A1* | 3/2013 | Dongen et al. | 715/847 |

FOREIGN PATENT DOCUMENTS

KR    10-2012-0007686 A    1/2012

OTHER PUBLICATIONS

"SBBrightness—Change Brightness From Your SpringBoard", Jul. 15, 2011, pp. 1-5, XP055094980.

(Continued)

*Primary Examiner* — Koosha Sharifi-Tafreshi
(74) *Attorney, Agent, or Firm* — Jefferson IP Law, LLP

(57) ABSTRACT

A method and an apparatus for operating an electronic device for changing a setting value are provided. In the method, a touch input for a set region is detected, so that a mode is switched to a setting change mode for changing a stored setting value. At least one guide interface for receiving a change of at least one setting value among stored setting values is displayed. A predetermined gesture for an arbitrary region of the displayed at least one guide interface is detected, so that whether to store a changed at least one setting value is determined.

20 Claims, 11 Drawing Sheets

(56) References Cited

OTHER PUBLICATIONS

"Beginners Guide to Android Tasker 1 Part 2 of 3", Aug. 7, 2012, pp. 1-4, XP055094982.

"Windows Mobile software for Pocket PC. Settings", Internet Citation, Oct. 28, 2005, XP007902342.

\* cited by examiner

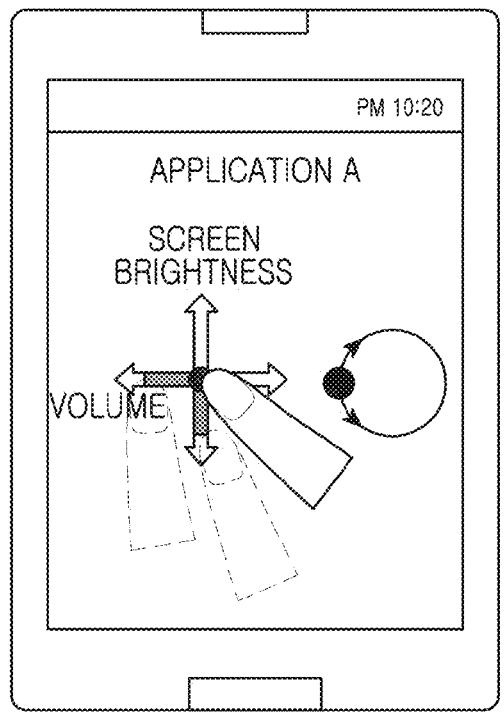 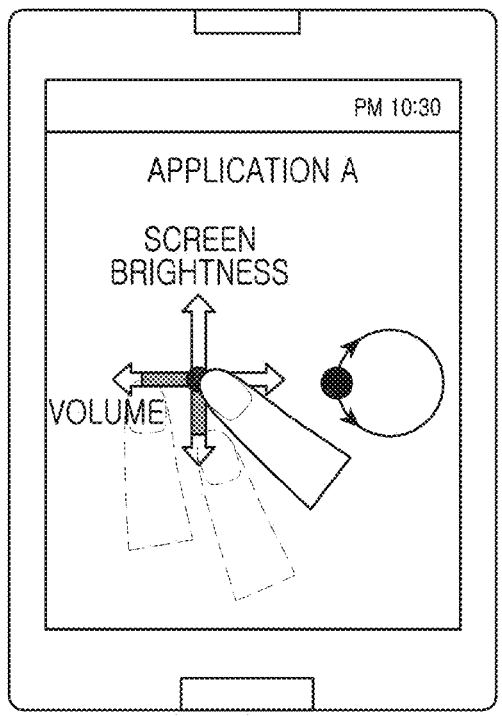
FIG.8A  FIG.8B
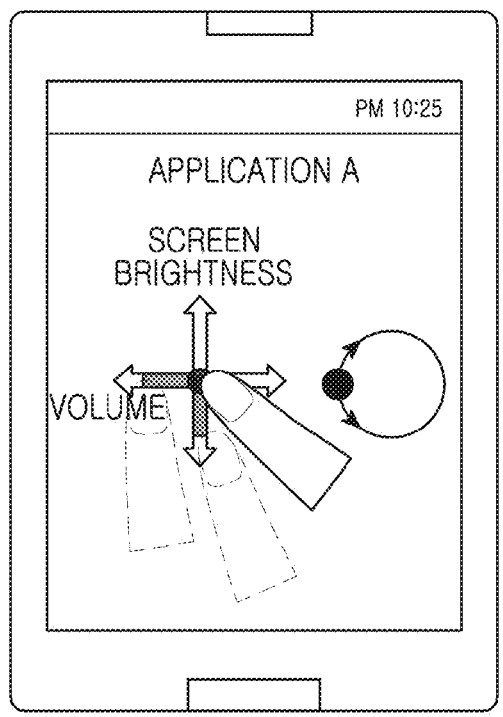 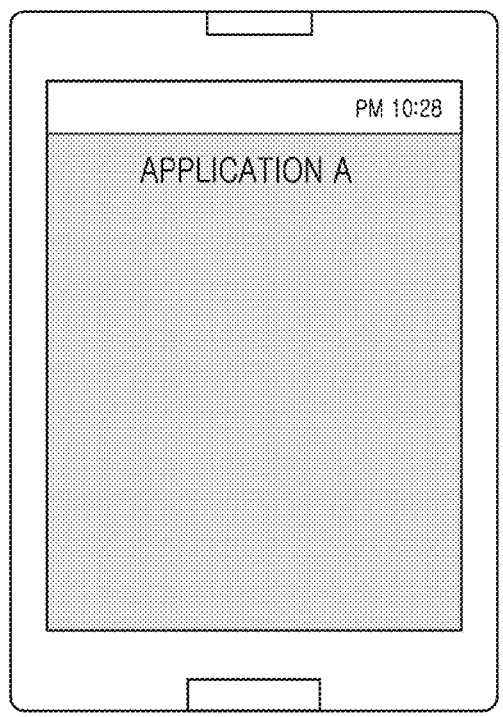
FIG.8C  FIG.8D

ELECTRONIC DEVICE AND METHOD FOR CHANGING SETTING VALUE

CROSS-REFERENCE TO RELATED APPLICATION(S)

This application claims the benefit under 35 U.S.C. §119 (a) of a Korean patent application filed on Nov. 12, 2012 in the Korean Intellectual Property Office and assigned Serial No. 10-2012-0127440, the entire disclosure of which is hereby incorporated by reference.

TECHNICAL FIELD

The present disclosure relates to an electronic device and a method for changing a setting value.

BACKGROUND

As the function of an electronic device develops, an electronic device having a high capacity storage space increases in order to install various softwares or store a high capacity file in the electronic device. Accordingly, in a case of executing an application stored in the electronic device, a user should set a setting value suitable for the kind of application and neighboring environment every time. For example, even in a case of executing the same application in an electronic device, it is desirable to reduce the volume of the application under a quiet environment and to increase a touch button lighting time in a case of executing the application in a dark place.

However, to change a setting value, a user has an inconvenience of having to end an application that has been executed, enter a menu for setting the configuration to change the setting value, and then execute the relevant application again. Also, in the case where a user changes a setting value while executing an application, since the user enters a configuration setup menu, the user may not determine a status change corresponding to the change of the setting value changing in real-time. Furthermore, when the setting value is set to a specific value in the electronic device, the set setting value is applied to all applications and thus is not suitable for the optimized execution environment of each application. That is, in a case of executing an application stored in the electronic device, the user should change the setting value so that it is suitable for the execution environment of each application every time.

Therefore, an electronic device is desired that allows a user to change a setting value while viewing a changed operating status in person depending on the change of a setting value without ending an application that is being executed, and an electronic device where a changed setting value has no influence on execution of an application afterward.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, a method for operating an electronic device for changing a setting value is provided. The method includes detecting a touch input for a set region to switch to a setting change mode for changing a stored setting value, displaying at least one guide interface for receiving a change of at least one setting value among stored setting values, and detecting a predetermined gesture for an arbitrary region of the displayed at least one guide interface to determine whether to store a changed at least one setting value.

Preferably, the set region is an indicator area on which at least one icon representing a current state is arranged.

Preferably, the detecting of the touch input for the set region to switch to the setting change mode for changing the stored setting value may include detecting the touch input for the set region for a set time or more, and detecting the touch input to switch to the setting change mode.

Preferably, the at least one guide interface may be a set shape for displaying that a drag is performed or that a touch is input in a first direction or a second direction from a set central region so that it controls one of the stored setting values.

Preferably, the method may further include: analyzing the detected gesture to change at least one of the stored setting values so that it matches the detected gesture, and reflecting the changed at least one setting value to change a system setting value.

Preferably, the determining of whether to store the changed at least one setting value may include determining that an idle mode is being executed on a foreground, receiving a touch input for an end of the idle mode being executed on the foreground, and storing the changed at least one setting value, and then ending the idle mode being executed on the foreground.

Preferably, the method may further include executing one of the idle mode and stored at least one application on the foreground, and detecting that the stored setting value has been reflected and that a system setting value has been changed.

Preferably, the determining of whether to store the changed at least one setting value may include determining that an arbitrary application is being executed on a foreground, receiving a touch input for an end of the application being executed on the foreground, and ending the execution of the application without storing the changed at least one setting value.

Preferably, the method may further include: executing one of the idle mode and stored at least one application on the foreground, and detecting a setting value before the change has been reflected and a system setting value has not changed.

Preferably, the method may further include discriminating each application of a stored at least one application to store data information, detecting that the data information of the at least one application has been stored by a set capacity or more, and when determining that the application whose data information has been stored by the set capacity or more is being executed on a foreground, applying a setting value reflecting the stored data information.

Preferably, the applying of the setting value reflecting the stored data information may include reflecting at least one piece of data information of an execution time of the application whose data information has been stored by the set capacity or more, Global Positioning System (GPS) information, and a battery capacity to apply the setting value.

In accordance with another aspect of the present disclosure, an electronic device for changing a setting value is provided. The electronic device includes a touchscreen configured to display at least one guide interface for receiving a change of at least one setting value among stored setting values, and a processor unit configured to detect a touch input for a set region to switch to a setting change mode for changing the stored setting value, and to detect a predetermined gesture for an arbitrary region of the displayed at least one guide interface to determine whether to store a changed at least one setting value.

Preferably, the set region may be an indicator area on which at least one icon representing a current state is arranged.

Preferably, the processor unit may detect the touch input for the set region for a set time or more to switch to the setting change mode.

Preferably, the at least one guide interface may be a set shape for displaying that a drag is performed or that a touch is input in a first direction or a second direction from a set central region so that it controls one of the stored setting values.

Preferably, the processor unit may analyze the detected gesture to change at least one of the stored setting values so that it matches the detected gesture, and reflect the changed at least one setting value to change a system setting value.

Preferably, the touchscreen may receive a touch input for an end of an idle mode being executed on a foreground, and the processor unit may determine that the idle mode is being executed on the foreground, store the changed at least one setting value, and then end the idle mode being executed on the foreground.

Preferably, the processor unit may execute one of the idle mode and stored at least one application on the foreground, and detect that the stored setting value has been reflected and a system setting value has been changed.

Preferably, the touchscreen may receive an end of an idle mode being executed on a foreground, and the processor unit may determine an arbitrary application is being executed on a foreground, and end the execution of the application without storing the changed at least one setting value.

Preferably, the processor unit may execute one of the idle mode and stored at least one application on the foreground, and detect a setting value before the change has been reflected and a system setting value has not changed.

Preferably, the electronic device may further include a memory for discriminating each application of a stored at least one application to store data information, and the processor unit may detect that data information of the at least one application has been stored by a set capacity or more, and when determining that the application whose data information has been stored by the set capacity or more is being executed on a foreground, apply a setting value reflecting the stored data information.

Preferably, the processor unit may reflect at least one piece of data information of an execution time of the application whose data information has been stored by the set capacity or more, GPS information, and a battery capacity to apply the setting value.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain various embodiments of the present disclosure will be more apparent from the following description taken in conjunction with the accompanying drawings, in which:

FIGS. 8A to 8D are views illustrating an embodiment of reflecting stored data information to apply a setting value according to an embodiment of the present disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
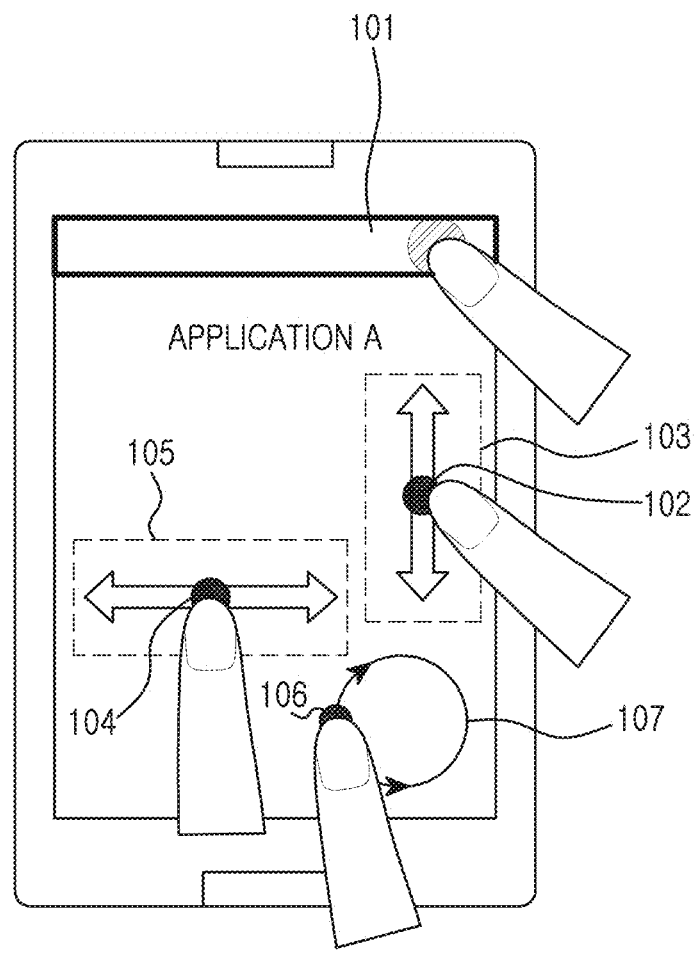
FIG. 1 is a view illustrating an electronic device for changing a setting value according to an embodiment of the present disclosure.

FIG. 1 is a view illustrating an electronic device for changing a setting value according to an embodiment of the present disclosure.

Referring to FIG. 1, the electronic device for changing a setting value includes an indicator area 101 and one or more guide interfaces 103, 105, 107.

First, the indicator area 101 may be defined as an area on which icons representing at least one status are arranged. More specifically, the indicator area 101 is an area on which icons representing statuses of the current battery capacity, the reception sensitivity of the electronic device, whether an alarm is set, and whether there is a connection via Wi-Fi are arranged. That is, the indicator area 101 is an area for displaying the current status of the electronic device on the upper end portion of the touchscreen of the electronic device using implicative icons. Therefore, a user may recognize the current battery capacity, the reception sensitivity of the electronic device, whether an alarm is set, whether there is a connection via Wi-Fi, and a time by viewing the indicator area 101.

The electronic device according to the present disclosure may detect a touch input for the indicator area 101 to switch to a setting change mode for changing a stored setting value. More specifically, the electronic device may detect a touch input for the indicator area 101 for a set time or more to switch to the setting change mode for changing the stored setting value. For example, assuming that the time set in the electronic device is 3 seconds, when detecting a touch input for the indicator area 101 for 3 seconds or more, the electronic device may switch to the setting change mode for changing the stored setting value. Here, to switch to the setting change mode for changing the stored setting value, the electronic device should receive the touch input for the indicator area 101 for the set time or more. The reason the electronic device should receive the touch input for the indicator area 101 for the set time or more to switch to the setting change mode is for preventing a malfunction that may occur in the electronic device. More specifically, in the case where the electronic device does not require the touch input for the indicator area 101 for the set time or more to switch to the setting change mode, a malfunction where the electronic device switches to the setting change mode by the user's unintended input may occur. Consequently, the electronic device according to the present disclosure may detect the touch input for the indicator area 101 for the set time or more to switch to the setting change mode for changing the setting value stored in the electronic device.

Here, the setting value denotes a value included in the configuration setup menu of the electronic device, and may be defined as a configuration setup value currently applied to the electronic device. More specifically, the setting value is a value that allows the user who enters the configuration setup menu of the electronic device to change or input the configuration setup value currently applied to the electronic device. For example, whether to connect the electronic device via Wi-Fi, whether a vibration intensity is set, whether to connect via Bluetooth, whether a screen brightness is set, whether a screen automatic rotation is applied, whether a battery capacity is displayed, whether a power save mode is set, whether a touch lighting time is set, whether a bell sound size is set, etc. may be included in the setting values. That is, all values included in the configuration setup menu of the electronic device may be defined as the setting value. The above setting value may be a value that may be displayed using on or off, and may be a value that may be controlled using up or down.

For example, whether to connect the electronic device via Wi-Fi, whether to connect via Bluetooth, whether the screen automatic rotation is applied, whether the battery capacity is displayed, whether the power save mode is set are setting values that may be displayed using on or off Whether the bell sound size is set, whether the vibration intensity is set, whether the screen brightness is set, whether screen automatic turn off time is set, and whether the touch button lighting time is set are setting value that may be controlled using up or down.

The guide interfaces 103, 105, 107 may be defined as a set shape for displaying that a drag is performed or displaying that a touch is input in a first direction or a second direction from set central regions 102, 104, 106 so that it controls one of setting values stored in the electronic device. More specifically, the guide interfaces 103, 105, 107 may be defined as at least one interface displayed on the touchscreen to allow the user to easily set or control a setting value. That is, when detecting a touch input for the indicator area 101 for a set time or more, the electronic device may switch to the setting change mode for changing a stored setting value, and simultaneously display the at least one guide interface 103, 105, 107 on the touchscreen so that the user may conveniently change a setting value. For example, three guide interfaces 103, 105, 107 are displayed in FIG. 1. Operating methods of the respective guide interfaces 103, 105, 107 are described, respectively.

First, the guide interface 103 for controlling a setting value in an up/down direction from the set central region 102 may receive a touch input for the set central region 102 from the user and then control to increase or decrease the setting value. For example, in the case where the guide interface 103 displayed on the touchscreen is for controlling a setting value of the volume, the electronic device may receive a touch input for the set central region 102, and then detect a drag or receive a touch input in the up arrow direction or down arrow direction to change the setting value of the volume. That is, in a case of receiving a touch input for the set central region 102, the electronic device switches to a mode for controlling a setting value of the volume. After that, the electronic device may display a numerical value representing the volume of the set central region 102 as 10 which is a basic default value, and then display a volume value added or subtracted from the volume of 10 depending on a drag direction or a touch input direction detected from the user using a numerical value. That is, after inputting the set central region 102 using a touch, the user may drag or input a touch in the up arrow direction or down arrow direction to control a detailed volume value or change an existing volume value.

For another example, the guide interface 105 for controlling a setting value in the left/right direction from a set central region 104 may receive a touch input for the set central region 104 from the user, and then control to increase or decrease the set setting value. For example, in the case where the guide interface 105 displayed on the touchscreen is for controlling a setting value of screen brightness, the electronic device may receive a touch input for the set central region 104, and then detect a drag or receive a touch input in the left arrow direction or right arrow direction to change the setting value of the screen brightness. That is, in the case where the electronic device receives a touch input for the set central region 104, the electronic device switches to a mode for controlling a setting value of screen brightness. After that, the electronic device may display a numerical value representing the screen brightness of the set central region 104 as 10 which is a basic default value, and then display screen brightness added or subtracted from the screen brightness of 10 depending on a drag direction or a touch input direction detected from the user using a numerical value. That is, after inputting the set central region 104 via a touch, the user may drag or input a touch in the left arrow direction or right arrow direction to control detailed screen brightness or change existing screen brightness.

For still another example, the guide interface 107 for controlling a setting value in the clockwise direction or the counterclockwise direction from the set central region 106 may receive a touch input for the set central region 106 from the user and then control to turn on or off a set setting value. For example, in the case where the guide interface 107 displayed on the touchscreen is for setting whether to connect the electronic device via Wi-Fi, the electronic device may receive a touch for the set central region 106, and then detect a drag in the clockwise direction or the counterclockwise direction to set whether to connect the electronic device via Wi-Fi. That is, when receiving a touch input for the set central region 106, the electronic device switches to a mode for setting whether to connect via Wi-Fi. After that, the electronic device may detect a drag in the clockwise direction to connect via Wi-Fi and detect a drag in the counterclockwise to turn off a state where the electronic device is connected via Wi-Fi. That is, the user may input the set central region 106 via a touch, and then drag in the clockwise direction or counterclockwise direction to set or change whether to connect via Wi-Fi.

In the related art, to change a setting value applied to the electronic device, a user should end an application being executed, enter a configuration setup region for changing a setting value to change a desired setting value, and then execute the application again. That is, the user has an inconvenience of having to end the application being executed, change a setting value, and execute the application again. Also, the user may not control a detailed setting value while viewing a setting value changing in real-time using his eyes in person. However, the electronic device according to the present disclosure may detect a touch input for the indicator area 101 for a set time or more to switch to a setting change mode for changing a stored setting value, and receive an input of an arbitrary region of the displayed guide interface via a touch to reflect a setting value changing in real-time. More specifically, the user may immediately control a setting value without ending an application separately while the application is being executed, so that the user's interaction reduces. Also, the user may control a detailed setting value so that it is suitable for the environment of each application while viewing a setting value changing in real-time using his eyes in person.

The electronic device according to the present disclosure may detect a predetermined gesture for an arbitrary region of a guide interface displayed on the touchscreen to determine whether to store at least one setting value. More specifically, the electronic device may detect a predetermined gesture for an arbitrary region of the guide interfaces 103, 105, 107 to determine whether to store at least one setting value depending on a mode being executed on the foreground in the electronic device. That is, the electronic device may apply a changed setting value, and then determine whether to store the changed setting value depending on the mode currently being executed on the foreground in the electronic device. Here, the modes being executed on the foreground in the electronic device may be classified into an idle mode and an application execute mode.

First, in the case where the mode being executed on the foreground in the electronic device is the idle mode, the electronic device stores a changed at least one setting value, and then applies the changed at least one setting value when operating. More specifically, when the electronic device has changed at least one setting value during execution of the idle mode, the changed setting value is stored in the electronic device. For example, in the case where the electronic device receives an input for increasing the brightness of a screen during the idle mode, the electronic device increases the brightness of the screen in the current idle mode by the input value and the changed brightness of the screen may be stored in the electronic device. That is, in the case where the electronic device executes a different application or the electronic device is executed again in the idle mode, the electronic device may display a screen on the touchscreen according to the previously stored brightness of the screen.

Next, in the case where an application is executed on the foreground in the electronic device, the electronic device does not store a changed at least one setting value and the changed setting value is not applied afterward together with ending of the application. More specifically, in the case where the electronic device changes at least one setting value while executing an application on the foreground, the electronic device does not store the changed setting value in the electronic device. For example, assume that a screen automatic turn off time has been changed from 3 seconds to 10 seconds while the electronic device executes an arbitrary application on the foreground. In the above assumption, the screen automatic turn off time is changed from 3 seconds to 10 seconds while the electronic device executes the relevant application, but 10 seconds which is the changed screen automatic turn off time is not stored together with ending of the application. Therefore, in the case where the electronic device executes a different application, the changed screen automatic turn off time is not stored, so that the screen automatic turn off time of the different application may be set to 3 seconds which is the same as before. That is, while the electronic device according to the present disclosure executes each application on the foreground, when a setting value is changed, the changed setting value is not stored together with ending of the application being executed.

Consequently, according to the electronic device of the related art, in the case where the idle mode is being executed on the foreground or an arbitrary application is being executed on the foreground in the electronic device, to change a setting value of the electronic device, only one setting value may be changed at a time. Also, the changed setting value in the electronic device has been applied to not only an application being executed on the foreground in the electronic device but also a different application after the executed application ends. Therefore, a user has an inconvenience of having to change a stored setting value every time depending on an environment under which the application is executed or the characteristic of each application. However, according to the present disclosure, in the case where a setting value is changed while each application is executed, the changed setting value of the electronic device is applied only during execution of the application, and the changed setting value is not stored together with ending of the executed application. Therefore, according to the electronic device of the present disclosure, the changed setting value is not stored together with ending of the executed application, so that an inconvenience of having to newly change a setting value so that it is suitable for the characteristic of each application every time is removed.

FIGS. 2A to 2D are views illustrating an embodiment of detecting a predetermined gesture for an arbitrary region of a guide interface displayed on a touchscreen to change a setting value according to an embodiment the present disclosure.

Figure 2A:
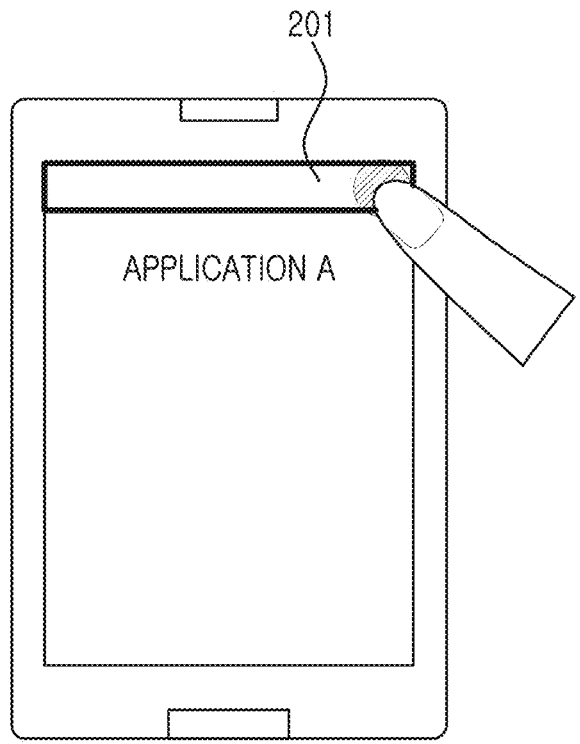
FIGS. 2A to 2D are views illustrating an embodiment of detecting a predetermined gesture for an arbitrary region of a guide interface displayed on a touchscreen to change a setting value according to an embodiment of the present disclosure.

Referring to FIG. 2A, an electronic device that executes an application A on the foreground may detect a touch input for an indicator area 201 which is a set region to switch to a setting change mode for changing a stored at least one setting value. More specifically, the electronic device may detect a touch input for the indicator area 201 for a set time or more to switch to the setting change mode for changing a stored at least one setting value. For example, assuming that a time set at the electronic device is 2 seconds, when detecting a touch input for the indicator area 201 for 2 seconds or more, the electronic device may switch to the setting change mode for changing a stored setting value. Here, to switch to the setting change mode for changing a stored setting value, the electronic device should receive a touch input for the indicator area 201 for the set time or more. The reason the electronic device should receive the touch input for the indicator area 201 for the set time or more to switch to the setting change mode is for preventing a malfunction that may occur in the electronic device. In the case where the electronic device does not require the touch input for the indicator area 201 for the set time or more to switch to the setting change mode, a malfunction where the electronic device switches to the setting change mode by the user's unintended input may occur. That is, the electronic device according to the present disclosure may detect the touch input for the indicator area 201 for the set time or more to switch to the setting change mode for changing at least one setting value stored in the electronic device.

Figure 2B:
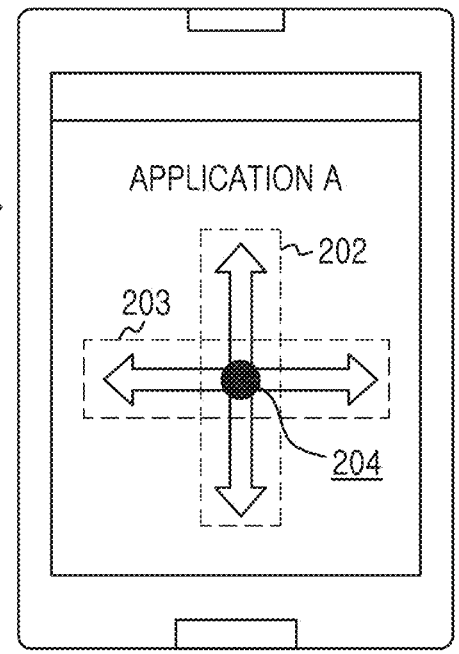

Referring to FIG. 2B, the electronic device may display at least one guide interface 202 and 203 on the touchscreen. Here, the guide interfaces 202 and 203 may be defined as a set shape for displaying that a drag is performed or displaying that a touch is input in a first direction or a second direction from a set central region 204 so that it controls one of setting values stored in the electronic device. More specifically, the guide interfaces 202 and 203 may be defined as at least one interface displayed on the touchscreen to allow the user to easily set or control a setting value. That is, when detecting a touch input for the indicator area 201 for a set time or more, the electronic device may switch to the setting change mode for changing a stored setting value, and simultaneously display the at least one guide interface 202 and 203 on the touchscreen so that the user may conveniently change a setting value. Though the guide interface 202 for controlling a setting value in the up/down direction from the set central region 204, and the guide interface 203 for controlling a setting value in the left/right direction are displayed in the present embodiment, a guide interface may be displayed in the diagonal direction, so that one direction may be set as a direction for increasing a setting value and the other direction may be set as a direction for decreasing a setting value, of course.

Figure 2C:
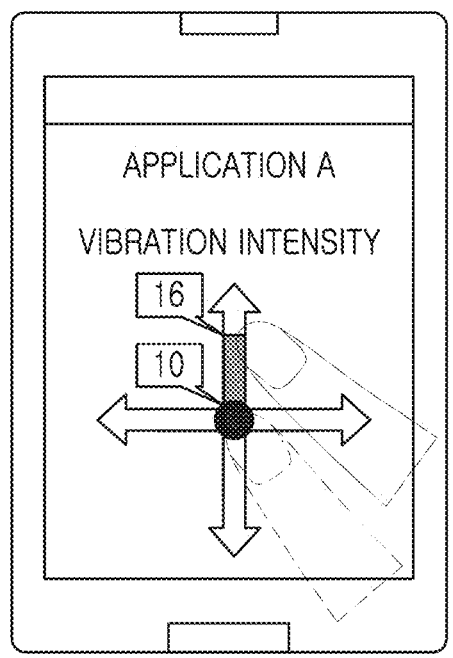

Referring to FIG. 2C, the electronic device may receive a touch input for an arbitrary region of a guide interface from a user, or detect an arbitrary region is dragged to change a setting value. First, the guide interface 202 for controlling a setting value in the up/down direction from the set central region 204 may receive a touch input for the set central region 204 from the user and then control to increase or decrease the set setting value. For example, in the case where the guide interface 202 displayed on the touchscreen is for controlling a setting value of vibration intensity, the electronic device may receive a touch input for the set central region 204 and then detect the region is dragged to the up arrow direction or down arrow direction, or receive a touch to change a setting value of the vibration intensity. That is, in the case where the electronic device receives a touch input for the set central region 204, the electronic device switches to a mode for changing a setting value of the vibration intensity. After that, the electronic device may display a numerical value representing the vibration intensity of the set central region 204 as 10 which is a basic default value, and then display a vibration intensity value added/subtracted to/from the vibration intensity of 10 depending the drag direction or the touch input direction detected from the user as a numerical value. In the present embodiment, the electronic device may receive a touch input for the set central region 204, and then detect the central region 204 is dragged in the up arrow direction or receive a touch to display a vibration intensity of 16 which is an increased vibration intensity using a numerical value. That is, the user may input a touch for the set central region 204 and then drag the central region in the up arrow direction or down arrow direction, or input a touch to control a detailed vibration intensity or change an existing vibration intensity.

Figure 2D:
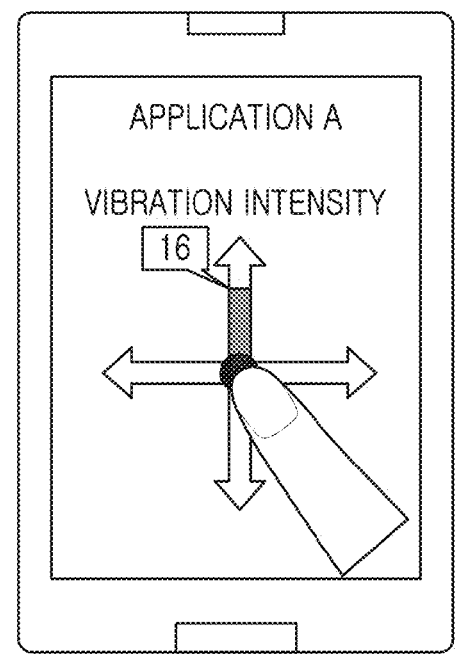

Referring to FIG. 2D, when receiving a touch input for the set central region 204 from the user again, the electronic device may apply the changed setting value. More specifically, when receiving a touch input for the set central region 204 again, the electronic device may apply the changed setting value, and though not shown in FIG. 2D, the electronic device may display a separate guide message to allow the user to select an end button from the guide message and apply the changed setting value. However, since receiving, at the electronic device, the end button and applying the changed setting value requires a process of displaying, at the electronic device, the guide message on the touchscreen again and then allowing the user to input the end button again, the number of the user's interactions may increase. Therefore, to reduce the number of the user's interactions, it may be preferable to receive a touch for the set central region 204 again as in the above embodiment.

FIGS. 3A to 3D are views illustrating another embodiment of detecting a predetermined gesture for an arbitrary region of a guide interface displayed on a touchscreen to change a setting value according to an embodiment the present disclosure.

Figure 3A:
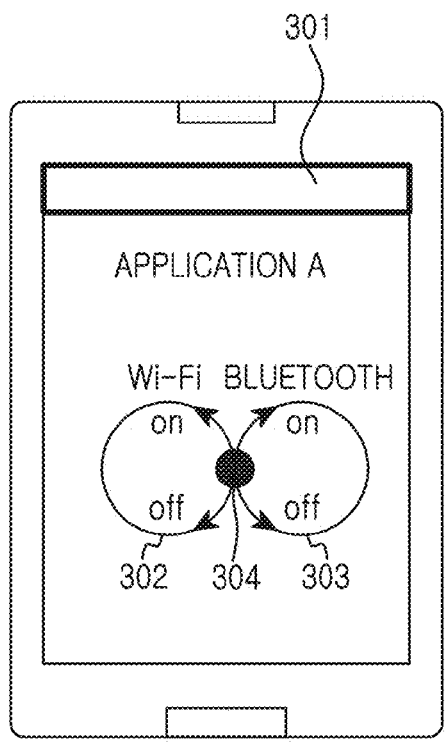
FIGS. 3A to 3D are views illustrating another embodiment of detecting a predetermined gesture for an arbitrary region of a guide interface displayed on a touchscreen to change a setting value according to an embodiment of the present disclosure.

Referring to FIG. 3A, an electronic device that executes an application A on the foreground may detect a touch input for an indicator area 301 which is a set region for a set time or more to switch to a setting change mode for changing at least one setting value stored in the electronic device. More specifically, the electronic device may detect a touch input for the indicator area 301 for the set time or more to display at least one guide interface 302 and 303 on the touchscreen. As illustrated in FIG. 3A, the electronic device may display the at least one guide interface 302 and 303 for controlling a setting value in the clockwise direction or the counterclockwise direction from the set central region 304 on an arbitrary region of the touchscreen.

Figure 3B:
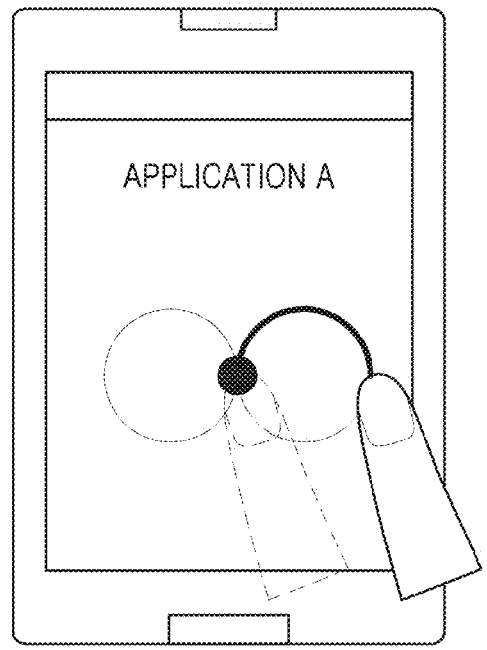
Figure 3C:
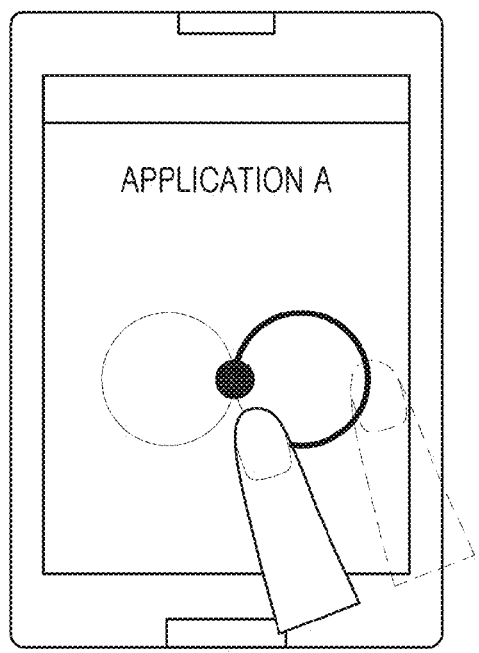

In the present embodiment, the electronic device may display the guide interface 302 for setting whether to connect the electronic device via Wi-Fi and the guide interface 303 for setting whether the electronic device and a set device are connectable via Bluetooth. That is, the left guide interface 302 of the guide interfaces 302 and 303 displayed on the touchscreen of the electronic device may set whether to connect the electronic device via Wi-Fi, and the right guide interface 303 may set whether the electronic device and a set device are connectable via Bluetooth. For example, the electronic device may receive a touch input for a set central region 304 of the guide interface 303 displayed on the right side of the touchscreen of the electronic device and then detect the central region is dragged in the clockwise direction or counterclockwise direction to set whether the electronic device and a set device are connectable via Bluetooth. That is, the electronic device may receive a touch input for the set central region 304 and then detect the central region is dragged in the clockwise direction as illustrated in FIGS. 3B and 3C to set so that the electronic device and the set device may be connected via Bluetooth.

Figure 3D:
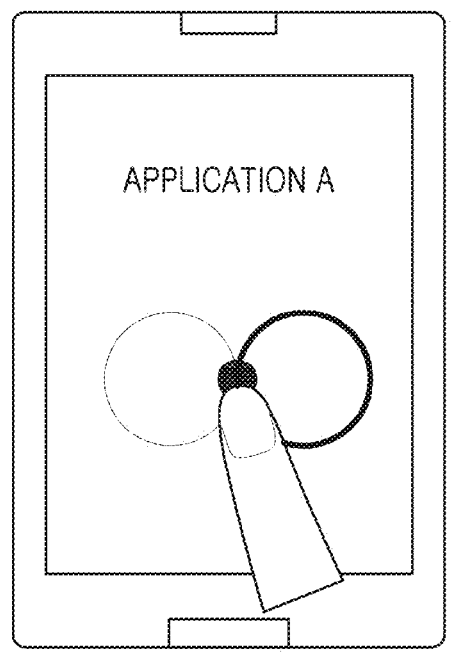

After that, as illustrated in FIG. 3D, when detecting the outline of the guide interface 303 is dragged in the clockwise direction and then the set central region is touched again, the electronic device may set so that the electronic device and the set device may be connected via Bluetooth. When receiving a touch input for the set central region 304 long for the set time or more, the electronic device may enter a state for preparing to receive a different guide interface. In the above example, when determining the set central region 304 is touched for less than 3 seconds which is the set time, the electronic device may set so that the electronic device and the set device may be connected via Bluetooth, and then end displaying at least one guide interface. When determining the set central region 304 is touched for 3 seconds which is the set time or more, the electronic device may set so that the electronic device and the set device may be connected via Bluetooth, and then enter a state for preparing to receive a different guide interface. That is, in the present embodiment, when determining the set central region 304 is touched for the set time or more, the electronic device may enter a state for setting whether to connect the electronic device via Wi-Fi.

FIGS. 4A to 4D are views illustrating still another embodiment of detecting a predetermined gesture for an arbitrary region of a guide interface displayed on a touchscreen to change a setting value according to an embodiment the present disclosure.

Figure 4A:
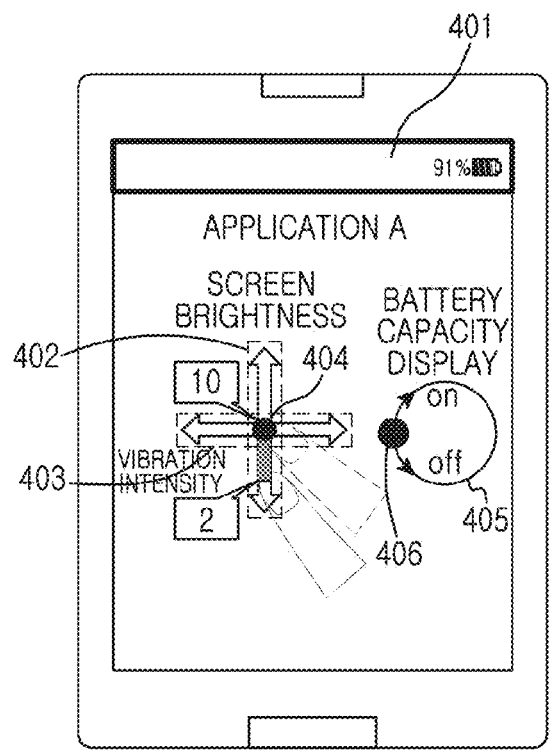
FIGS. 4A to 4D are views illustrating still another embodiment of detecting a predetermined gesture for an arbitrary region of a guide interface displayed on a touchscreen to change a setting value according to an embodiment of the present disclosure.

Referring to FIG. 4A, an electronic device that is executing an application A on the foreground may detect a touch input for an indicator area 401 which is a set region to switch to a setting change mode for changing a stored at least one setting value. More specifically, the electronic device may detect a touch input for the indicator area 401 for a set time or more to switch to the setting change mode for changing a stored at least one setting value. After that, the electronic device may display at least one guide interface 402, 403, 405 on the touchscreen. In the present embodiment, it is assumed that the guide interface 402 for controlling screen brightness, the guide interface 403 for controlling vibration intensity, and the guide interface 405, including a set central region 406, for setting battery capacity display are displayed. After that, as illustrated in FIG. 4A, the electronic device may receive a touch input for an arbitrary region of the guide interface from a user or detect an arbitrary region is dragged to change a setting value. First, the guide interface 402 for controlling a setting value in the up/down direction from a set central region 404 may receive a touch input for the set central region 404 from the user and then control to increase or decrease a set setting value. For example, in the case where the guide interface 402 displayed on the touchscreen is for controlling a setting value of screen brightness, the electronic device may receive a touch input for the set central region 404 and then detect the central region is dragged in the up arrow direction or down arrow direction or receive a touch input to change a setting value of screen brightness. That is, when receiving a touch input for the set central region 404, the electronic device switches to a mode for controlling a setting value of screen brightness. After that, the electronic device may display a numerical value representing the screen brightness of the set central region 404, for example, a basic default value of 10 and then display a revised brightness value added/subtracted to/from the screen brightness of 10 using a numerical value depending on a drag direction or a touch input direction detected from a user. In the present embodiment, the electronic device may receive a touch input for the set central region 404 and then detect the central region is dragged in the down arrow direction or receive a touch input to display screen brightness of 2 which is reduced screen brightness using a numerical value. That is, the user may input a touch for the set central region 404 and then drag or touch the central region in the up arrow direction or down arrow direction to control detailed screen brightness or change existing screen brightness.

Figure 4B:
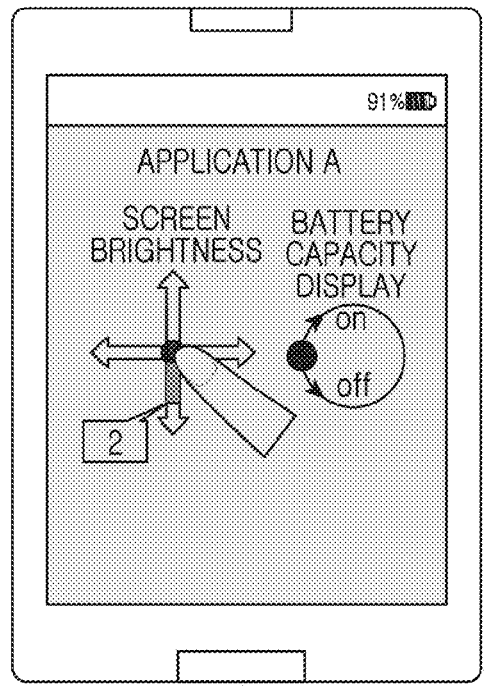

Referring to FIG. 4B, when receiving a touch input for the set central region 404 again from the user, the electronic device may apply the changed setting value. More specifically, when receiving a touch input for the set central region 404 again, the electronic device may apply the changed setting value, and though not shown in FIG. 4B, the electronic device may display a separate guide message to allow the user to select an end button from the guide message and apply the changed setting value. However, since receiving, at the electronic device, the end button and applying the changed setting value requires a process of displaying, at the electronic device, the guide message on the touchscreen again and then allowing the user to input the end button again, the number of the user's interactions may increase. Therefore, to reduce the number of the user's interactions, it may be preferable to receive a touch input for the set central region 404 again as in the above embodiment. Since screen brightness has changed from an existing numerical value of 10 to a numerical value of 2 in FIG. 4B, a screen is displayed darker than the previously stored setting value of screen brightness.

Figure 4C:
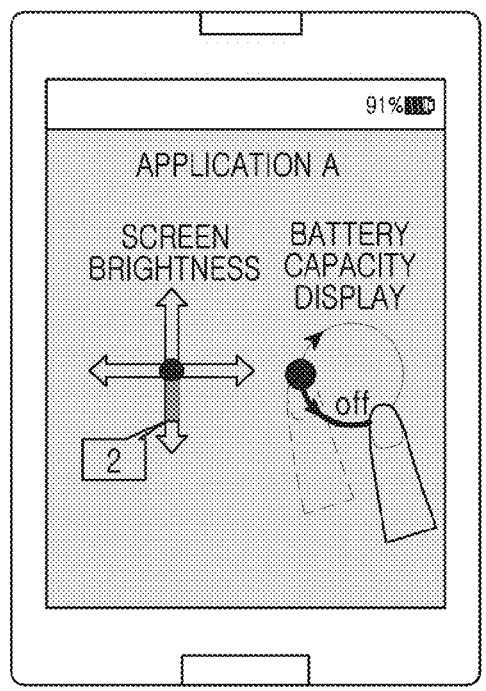
Figure 4D:
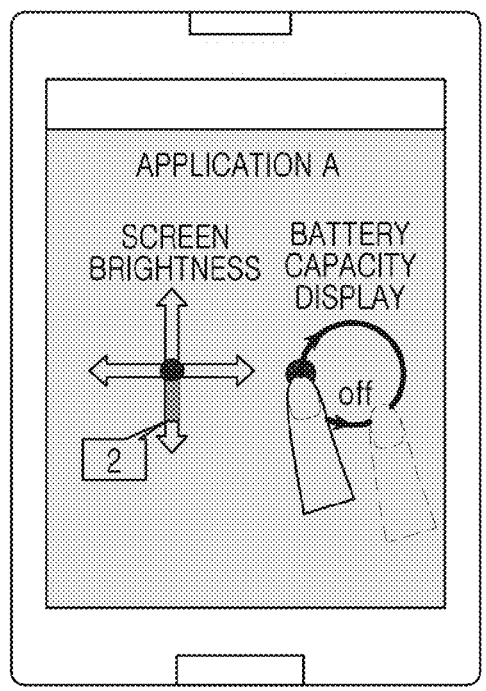

After that, the electronic device may set a setting value that may be displayed as on or off among setting values. That is, the electronic device may change at least one setting value. FIGS. 4C and 4D illustrate an embodiment for selecting the guide interface 405 for setting whether to display a battery capacity and setting a battery capacity. When receiving a touch input for the set central region 404 long for the set time or more, the electronic device may enter a state for preparing to receive a different guide interface. In the above example, when determining the set central region 404 is touched for less than the set time, the electronic device may change the screen brightness of the electronic device from an existing setting value of 10 to a setting value of 2, and then end the guide interfaces 402, 403, 405 displayed on the touchscreen. When determining the set central region 404 is touched for the set time or more, the electronic device may enter a state for preparing to receive other guide interfaces 403 and 405. That is, in the present embodiment, the electronic device may determine the set central region 404 is touched for the set time or more and enter a state for preparing to set whether to display the battery capacity of the electronic device. First, as illustrated in FIG. 4C, to set whether to display a battery capacity, the electronic device may receive a touch input for a set central region 406 of the guide interface 405. For example, the electronic device may receive a touch input for the set central region 406 of the guide interface 405 displayed on the touchscreen of the electronic device, and then detect the central region is dragged in the clockwise direction or the counterclockwise direction to set whether to display the battery capacity. In the present embodiment, the electronic device receives a touch input for the set central region 406, and as illustrated in FIGS. 4C and 4D, detects the central region is dragged in the counterclockwise not to set the battery capacity of the electronic device. That is, as illustrated in FIG. 4D, a battery display icon that has been displayed on the indicator area 401 of the electronic device disappears.

In the related art, to change a setting value applied to the electronic device, a user should end an application being executed, enter the configuration setup region for changing a setting value to change a desired setting value, and then execute the previous application again. That is, the user has an inconvenience of having to end the application being executed, change a setting value, and execute the application again. Also, the user may not control a detailed setting value while viewing the setting value changing in real-time using his eyes in person. However, the electronic device according to the present disclosure may detect a touch input for an indicator area for a set time or more to switch to a setting change mode for changing a stored setting value, and then receive a touch input for an arbitrary region of a displayed guide interface to reflect a setting value changing in real-time. More specifically, the user immediately controls a setting value without ending an application separately with the application executed, so that the user's interaction reduces. Also, the user may control a detailed setting value so that it is suitable for the environment of each application while viewing the setting value changing in real-time with his eyes in person.

Figure 5A:
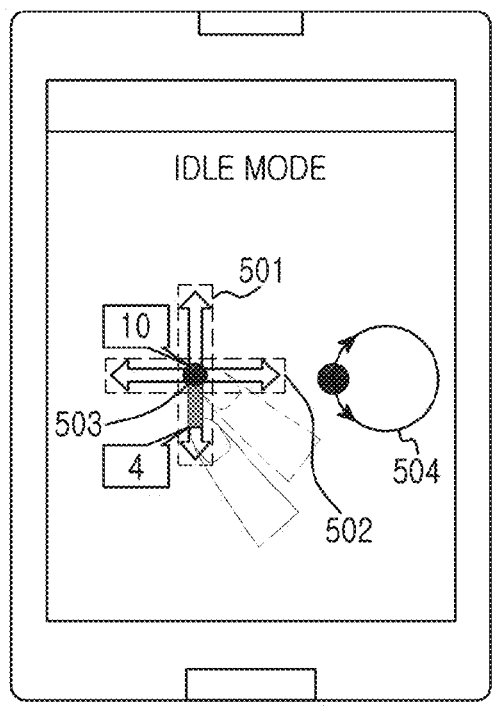
FIGS. 5A to 5C are views illustrating an embodiment of determining whether to store a changed at least one setting value in an electronic device according to an embodiment of the present disclosure.
Figure 5B:
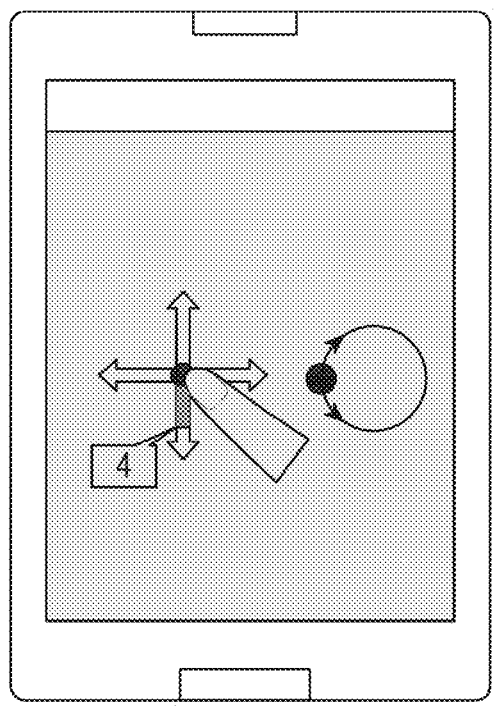
Figure 5C:
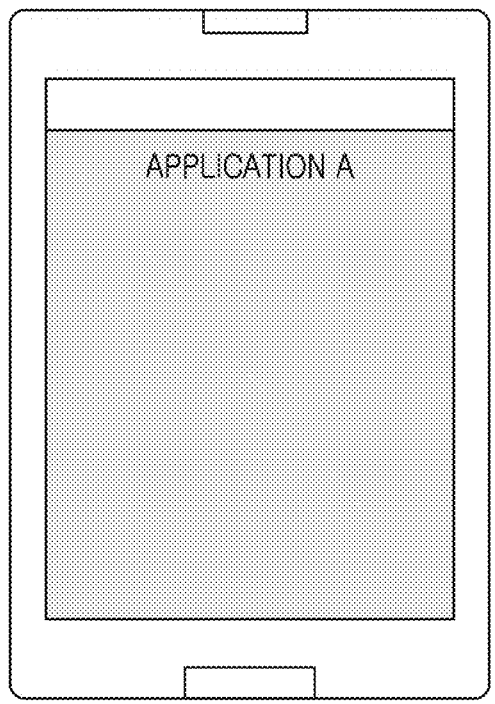

FIGS. 5A to 5C are views illustrating an embodiment of determining whether to store a changed at least one setting value in an electronic device according to an embodiment the present disclosure.

Referring to FIG. 5A, the electronic device that executes an idle mode on the foreground may receive a touch input for a set region for a set time or more to switch to a setting change mode for changing a stored at least one setting value. After that, the electronic device may display at least one guide interface 501, 502, 504 on the touchscreen. In the present embodiment, it is assumed that the guide interface 501 for controlling screen brightness, the guide interface 502 for controlling a bell sound, and the guide interface 504 for setting a power save mode are displayed. After that, as illustrated in FIG. 5A, the electronic device may receive a touch input for an arbitrary region of a guide interface from a user or detect an arbitrary region is dragged to change a setting value. First, the guide interface 501 may receive a touch input for a set central region 503 from a user and then control to increase or decrease a set setting value. In the above embodiment, the electronic device may receive a touch input for the set central region 503 and then detect the central region is dragged in the up arrow direction or down arrow direction or receive a touch input to change a setting value of screen brightness. That is, in the case where the electronic device receives a touch input for the set central region 503, the electronic device switches to a mode for controlling a setting value of screen brightness. After that, the electronic device may display a numerical value representing the screen brightness of the set central region 503 as a basic default value of 10, and then display a revised brightness value added/subtracted to/from the screen brightness of 10 using a numerical value depending on a drag direction or a touch input direction detected from a user. In the present embodiment, the electronic device may receive a touch input for the set central region 503 and then detect the central region is dragged in the down arrow direction or receive a touch input to display screen brightness of 4 which is reduced screen brightness using a numerical value.

Referring to FIG. 5B, when receiving a touch input for the set central region 503 from the user again, the electronic device may apply the changed setting value. More specifically, when receiving a touch input for the set central region 503 again, the electronic device may apply the changed setting value, and though not shown in FIG. 5B, display a separate guide message to allow the user to select an end button from the guide message to apply the changed setting value. However, since receiving, at the electronic device, the end button and applying the changed setting value requires a process of displaying, at the electronic device, the guide message on the touchscreen again and then allowing the user to input the end button again, the number of the user's interactions may increase. Therefore, to reduce the number of the user's interactions, it may be preferable to receive a touch for the set central region 503 again as in the above embodiment. Since screen brightness has changed from an existing numerical value of 10 to a numerical value of 4 in FIG. 5B, a screen is displayed darker than the previously stored setting value of screen brightness.

FIG. 5C illustrates an embodiment of applying a changed setting value in the case where an electronic device ends the previous idle mode and then executes an application A according to an embodiment of the present disclosure. The electronic device according to the present disclosure may detect a predetermined gesture for an arbitrary region of a guide interface displayed on the touchscreen to determine whether to store a changed at least one setting value. More specifically, the electronic device may detect a predetermined gesture for an arbitrary region of the guide interfaces 501, 502, 504 to determine whether to store a changed at least one setting value depending on a mode being executed on the foreground in the electronic device. That is, the electronic device may apply the changed setting value and then determine whether to store the changed setting value depending on the mode being executed currently on the foreground in the electronic device. Here, modes being executed on the foreground in the electronic device may be classified into the idle mode and an application execute mode. As in the present embodiment, in the case where a mode being executed on the foreground in the electronic device is the idle mode, the electronic device stores a changed at least one setting value and then applies the changed at least one setting value when executing the electronic device. More specifically, when the electronic device has changed at least one setting value while executing the idle mode, the electronic device may store the changed setting value. In the above example, since the electronic device has received an input for reducing the brightness of a screen in the idle mode, the electronic device may store the screen brightness of a numerical value of 4. As known in FIG. 5C, in a case of displaying an application A on the touchscreen depending on a changed setting value of the screen brightness of 4 in the idle mode, the electronic device may display the screen darker than the screen brightness before change.

FIGS. 6A to 6D are views illustrating another embodiment of determining whether to store a changed at least one setting value in an electronic device according to an embodiment the present disclosure.

Figure 6A:
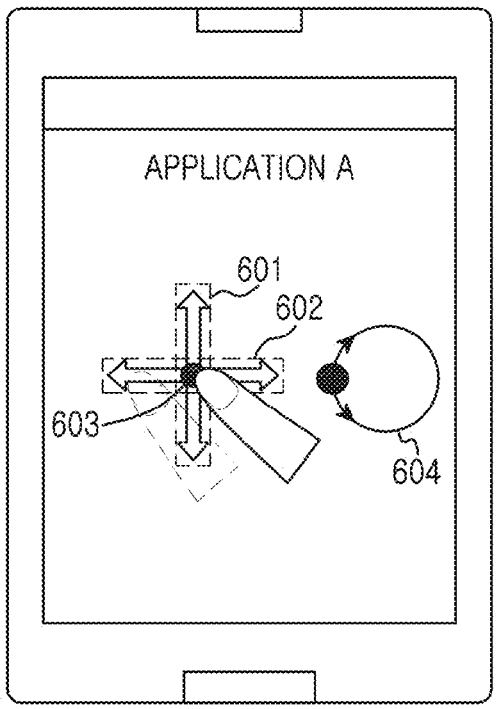
FIGS. 6A to 6D are views illustrating another embodiment of determining whether to store a changed at least one setting value in an electronic device according to an embodiment of the present disclosure.

Referring to FIG. 6A, the electronic device that executes an application A on the foreground may receive a touch input for a set region for a set time or more to switch to a setting change mode for changing a stored at least one setting value. After that, the electronic device may display at least one guide interface 601, 602, 604 on the touchscreen. In the present embodiment, it is assumed that the guide interface 601 for controlling a volume, the guide interface 602 for controlling a screen automatic turn off time, and the guide interface 604 for setting a power save mode are displayed. After that, as illustrated in FIG. 6A, the electronic device may receive a touch input for an arbitrary region of the guide interface from a user or detect the arbitrary region is dragged to change a setting value. First, the guide interface 602 may receive a touch input for a set central region 603 from a user and then control to increase or decrease a set setting value. In the above example, the electronic device may receive a touch input for the set central region 603 and then detect the central region is dragged in the left arrow direction or right arrow direction or receive a touch input to change a setting value of screen brightness. That is, in a case of receiving a touch input for the set central region 603, the electronic device may switch to a mode for controlling a screen automatic turn off time. After that, the electronic device may display a numerical value representing the screen automatic turn off time of the set central region 603 as a basic default value of 10 seconds, and then display a numerical value added/subtracted to/from the screen automatic turn off time of 10 seconds depending on a drag direction or a touch input direction detected from the user. In the present embodiment, the electronic device may receive a touch input for the set central region 603 and then detect the central region is dragged in the left arrow direction or receive a touch input to display a numerical value of 3 seconds which is a reduced screen automatic turn off time. After that, when receiving a touch input for the set central region 603 from the user again, the electronic device may apply the changed setting value. That is, the screen automatic turn off time has been changed from the previous 10 seconds to 3 seconds in the electronic device.

Figure 6B:
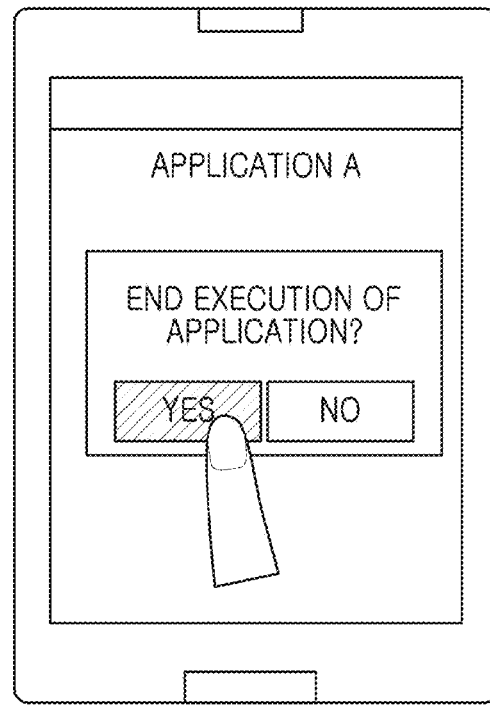
Figure 6C:
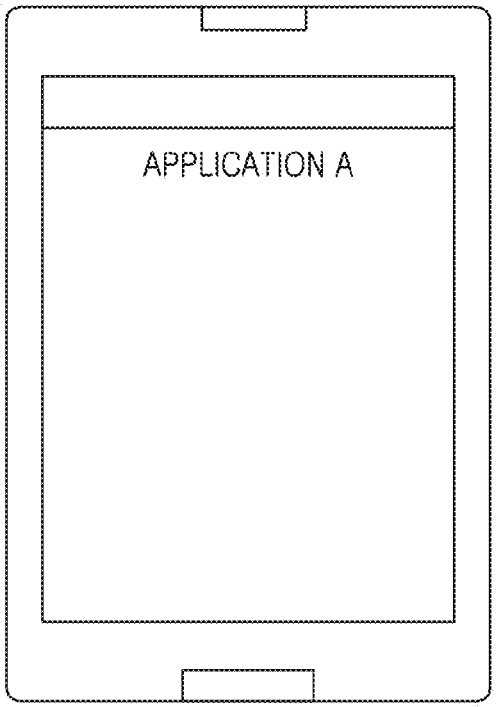
Figure 6D:
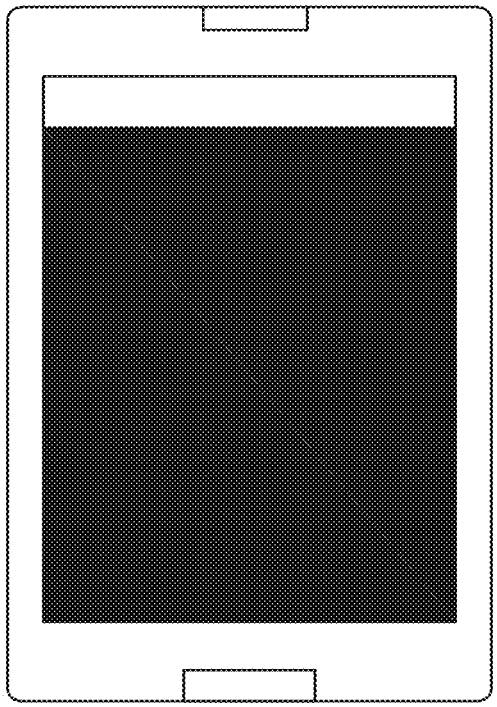

After that, the electronic device executes the application A with the changed screen automatic turn off time of 3 seconds, and then as illustrated in FIG. 6B, when receiving an input of the end of the application A, the electronic device may display a message as to whether to end execution of the application on the touchscreen. When receiving an input of the end of the application A as illustrated in FIG. 6B, the electronic device may end the application A. Here, the electronic device determines whether to store the screen automatic turn off time which is the changed setting value together. More specifically, when determining a setting value has not been changed in the idle mode and the setting value has been changed in a specific application, the electronic device determines the application being executed ends and simultaneously does not store the changed setting value. That is, as illustrated in FIG. 6C, in the case where the electronic device ends the application A and then executes the application A again, the electronic device does not apply the setting value changed while the previous application A is executed. In the above example, since the electronic device has not stored the screen automatic turn off time which is the changed setting value, the screen automatic turn off time is maintained as the previous 10 seconds. That is, in the case where the electronic device executes the application A again, the screen automatic turn off time of the electronic device may be applied as 10 seconds. As illustrated in FIG. 6D, in the case where the electronic device has not received a touch input from the user for 10 seconds while executing the application A, the electronic device may end displaying the application A on the touchscreen.

In the case where the idle mode is being executed on the foreground or an arbitrary application is being executed on the foreground in the electronic device, the electronic device of the related art may change only one setting value at a time in order to change a setting value of the electronic device. Also, the changed setting value in the electronic device is applied to not only an application being executed on the foreground currently but also a different application after the application being executed ends. Therefore, the electronic device of the related art has a problem of having to change a stored setting value every time depending on a neighboring environment under which an application is executed or the characteristic of each application. However, in the electronic device according to the present disclosure, in the case where a setting value is changed during execution of each application, the changed setting value of the electronic device is applied only during execution of the application and is not stored together with ending of the application being executed. Therefore, since the electronic device according to the present disclosure does not store a changed setting value together with ending of the application being executed, an inconvenience of having to newly change a setting value so that it is suitable for the characteristic of each application every time is removed.

FIGS. 7A to 7D are views illustrating still another embodiment of determining whether to store a changed store at least one setting value in an electronic device according to an embodiment the present disclosure.

Figure 7A:
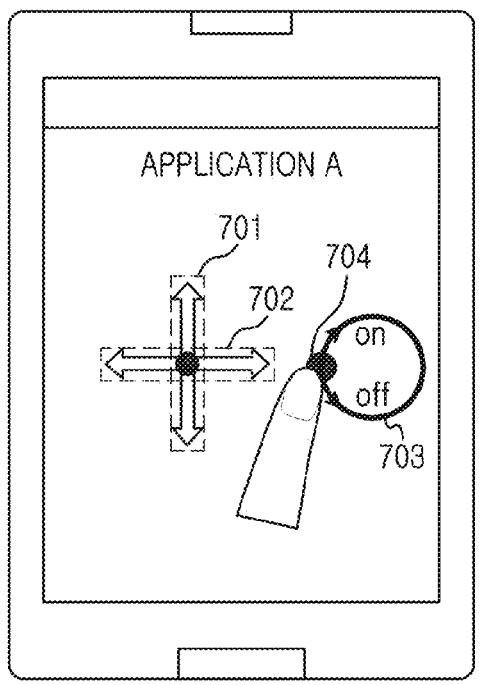
FIGS. 7A to 7D are views illustrating still another embodiment of determining whether to store a changed store at least one setting value in an electronic device according to an embodiment of the present disclosure.

Referring to FIG. 7A, the electronic device that is executing an application A on the foreground may receive a touch input for a set region for a set time or more to switch to a setting change mode. After that, the electronic device may display at least one guide interface 701, 702, 703 on the touchscreen. In the present embodiment, it is assumed that the guide interface 701 for controlling a touch volume, the guide interface 702 for controlling a touch button lighting time, and the guide interface 703 for setting screen automatic rotation are displayed. After that, the electronic device may receive a touch input for an arbitrary region of a guide interface from a user or detect the arbitrary region is dragged to change a setting value.

First, the electronic device may receive a touch input for a set central region 704 from the user and then detect the set central region 704 is dragged in the clockwise direction or the counterclockwise direction to control to turn on or off a set setting value. For example, the electronic device may detect the central region is dragged in the clockwise direction or the counterclockwise direction to set whether to automatically rotate the screen of the electronic device. That is, when receiving a touch input for the set central region 704, the electronic device switches to a mode for setting whether to automatically rotate the screen. After that, as illustrated in FIG. 7A, the electronic device may detect the central region is dragged in the clockwise direction to turn on a screen automatic rotate state.

Figure 7B:
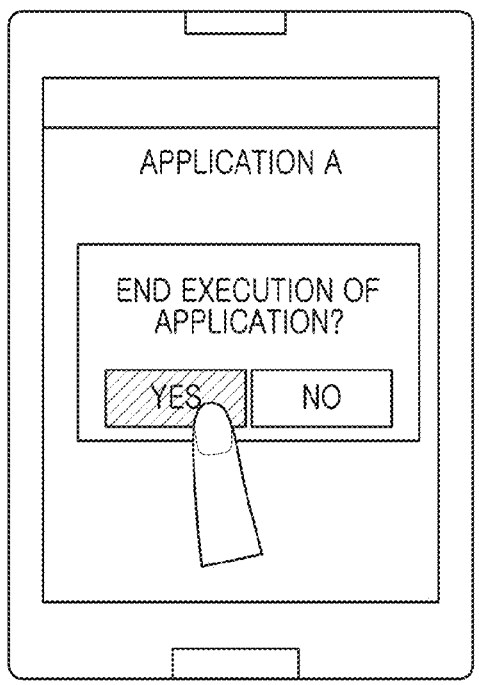
Figure 7C:
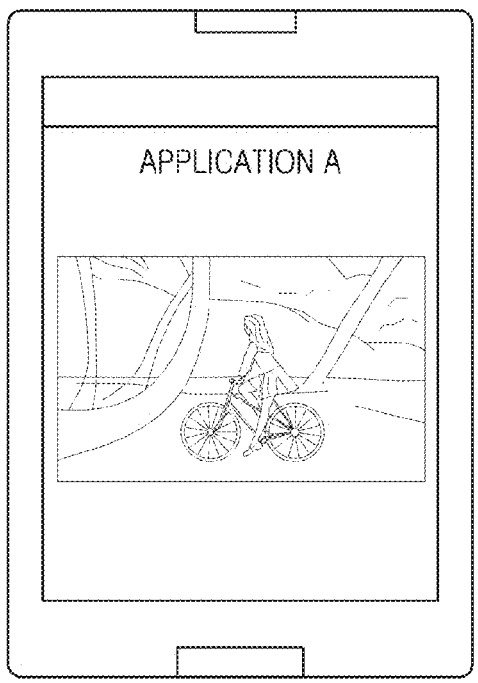
Figure 7D:
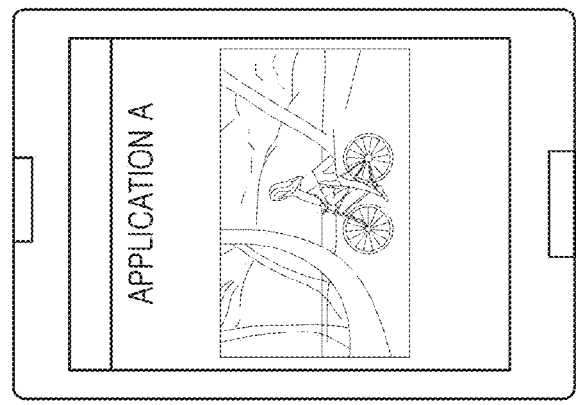

After that, the electronic device executes an application A at the changed screen automatic rotate state, and when receiving an input of the end of the application A as illustrated in FIG. 7B, the electronic device may display a message as to whether to end execution of the application on the touchscreen. When receiving an input for the end of the application A as illustrated in FIG. 7B, the electronic device may end the application A. Also, the electronic device according to the present disclosure may determine whether to store the screen automatic rotate state which is the changed setting value together. More specifically, when determining the setting value has changed during execution of an arbitrary application, the electronic device determines the application ends and simultaneously does not store the changed setting value. That is, in the case where the electronic device ends the application A and then executes the application A again as illustrated in FIG. 7C, the electronic device does not apply a setting value changed while the previous application A is executed. Of course, in the case where the electronic device executes not only the application A but also a different application, the setting value changed while the previous application A is executed is not applied. In the above example, since a screen automatic rotate state which is a setting value changed in the electronic device has not been stored, the screen automatic rotate state of the electronic device may be turned off even in the case where the electronic device executes the application A again. That is, in the case where the electronic device is rotated by 90 degrees while electronic device executes the application A again as illustrated in FIG. 7D, the electronic device may directly display the not-rotated screen on the touchscreen.

FIGS. 8A to 8D are views illustrating an embodiment of reflecting stored data information to apply a setting value according to an embodiment the present disclosure. The electronic device according to the present disclosure may reflect stored data information to apply a setting value. More specifically, the electronic device may collect at least one information of an execution time of each application, an execution place, and a battery state to reflect the same as a setting value of the electronic device. That is, in the case where the electronic device discriminates each application among stored one or more applications to store data information and detects data information of at least one application has been stored by a set capacity or more, the electronic device may apply a setting value reflecting the stored data information. More specifically, the electronic device may reflect at least one data information of an execution time of an application whose data information has been stored by the set capacity or more, Global Positioning System (GPS) information, and a battery capacity to automatically apply a setting value.

Referring to FIG. 8A, assuming that the electronic device has reduced both screen brightness and the volume by a predetermined amount at 10:20 pm while executing the application A, the electronic device may store data such as the numerical values of the reduced screen brightness and the reduced volume and the time while executing the application A. Also, as illustrated in FIGS. 8B and 8C, assume that the electronic device has reduced both the screen brightness and the volume by a predetermined amount at 10:30 pm and 10:25 pm, respectively while executing the application A. In each case, the electronic device may store data such as the numerical values of the reduced screen brightness and the reduced volume and the time while executing the application A to determine data information has been stored by a set capacity or more. After that, when determining the application A has been executed within the time range of the stored data information, the electronic device may automatically apply the stored data information to set a setting value of the application A. For example, as illustrated in FIG. 8D, when determining the application A has been executed at 10:28 pm which is between 10:20 pm and 10:30 pm which are the stored data information, the electronic device may reflect the stored data information to apply setting values of the screen brightness and the volume.

Though a time has been exemplarily described in the present embodiment, data information such as the GPS information and battery capacity of the electronic device may be used, of course. For example, assume that the electronic device has determined data information where a setting value changes in the neighborhood of a specific coordinate has been stored by a set capacity or more while executing the application A. After that, when determining the application A has been executed in the neighborhood of the stored specific coordinate, the electronic device may automatically change a setting value using the stored data information. Also, the electronic device may determine data information regarding changed screen brightness depending on whether a battery capacity has been stored by a set capacity or more while executing the application A to automatically set a setting value of the screen brightness depending on the stored battery capacity.

Figure 9:
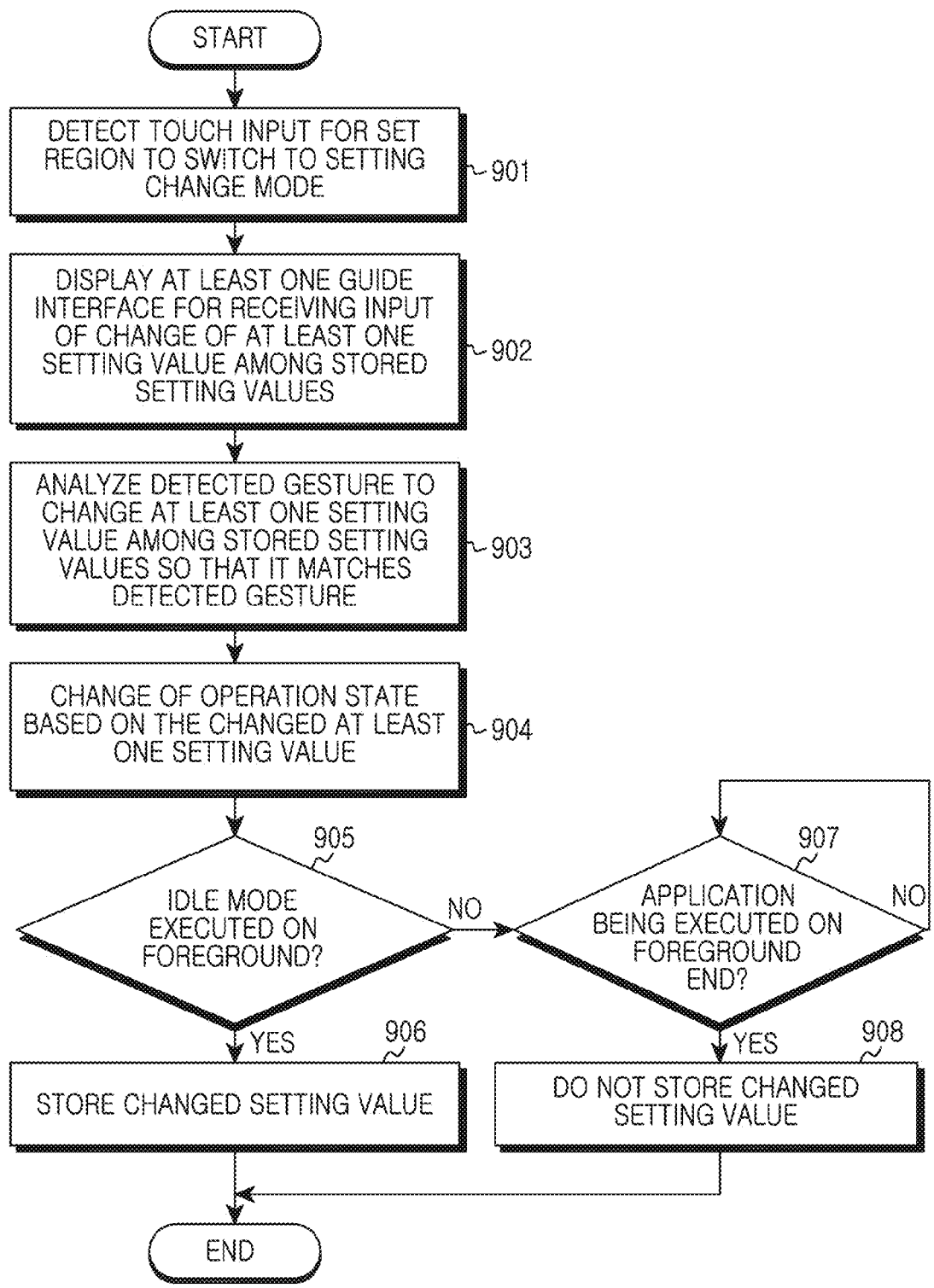
FIG. 9 is a flowchart illustrating a sequence for operating an electronic device according to an embodiment of the present disclosure.

FIG. 9 is a flowchart illustrating a sequence for operating an electronic device according to an embodiment the present disclosure.

Referring to FIG. 9, the electronic device may detect a touch input for a set region to switch to a setting change mode at operation 901. More specifically, the electronic device may detect a touch input for an indicator area for a set time or more to switch to the setting change mode for changing a stored setting value. For example, assuming that the set time of the electronic device is 3 seconds, when detecting a touch input for the indicator area for 3 seconds or more, the electronic device may switch to the setting change mode for changing a stored setting value. Here, to switch to the setting change mode for changing to a setting value, the electronic device should receive a touch input for the indicator area for the set time or more as described above. The reason the electronic device should receive the touch input for the indicator area for the set time or more to switch to the setting change mode is for preventing a malfunction that may occur in the electronic device. More specifically, in the case where the electronic device does not require the touch input for the indicator area for the set time or more to switch to the setting change mode, a malfunction where the electronic device switches to the setting change mode by the user's unintended input may occur.

The electronic device that has switched to the setting change mode may display at least one guide interface for receiving an input of a change of at least one setting value among stored setting values at operation 902. The guide interface may be defined as a set shape for displaying that a drag is performed or displaying that a touch is input in a first direction or a second direction from a set central region so that it controls one of setting values stored in the electronic device. More specifically, the guide interface may be defined as at least one interface displayed on the touchscreen to allow the user to easily set or control a setting value.

The electronic device that has displayed at least one guide interface may analyze a detected gesture to change at least one setting value of stored setting values so that it matches the detected gesture at operation 903. First, a guide interface for controlling a setting value in the up/down direction from the set central region may receive a touch input for the set central region from a user and then control to increase/decrease the setting value. For example, in the case where the guide interface displayed on the touchscreen is for controlling a setting value of the volume, the electronic device may receive a touch input for the set central region and then detect the central region is dragged in the up arrow direction or down arrow direction or receive a touch input to change the setting value of the volume. For another example, a guide interface for controlling a setting value in the clockwise direction or counterclockwise direction from the set central region may receive a touch input for the set central region from the user and then control to turn on or off the set setting value. For example, in the case where a guide interface displayed on the touchscreen is for setting whether to connect the electronic device via Wi-Fi, the electronic device may receive a touch input for the set central region and then detect the central region is dragged in the clockwise direction or counterclockwise direction to set whether to connect the electronic device via Wi-Fi.

The electronic device that has changed at least one setting value may reflect the changed at least one setting value to change an operation state at operation 904. More specifically, when receiving an input of a change of at least one setting value, the electronic device may apply the received changed setting value and execute the same. For example, in the case where the electronic device receives a setting of screen brightness set to dark, the electronic device may apply the screen brightness which is the set setting value and display the screen.

After that, the electronic device may determine whether an idle mode is executed on the foreground at operation 905. More specifically, even though numerous applications are being executed on the background in the electronic device, the electronic device may determine whether a mode being executed on the foreground is the idle mode. For example, even when a first application and a second application are being executed on the background, the electronic device may determine whether the mode being executed on the foreground is the idle mode.

When determining the idle mode is being executed on the foreground in the above determine process 905, the electronic device may store the changed setting value at operation 906. More specifically, after applying the changed setting value, the electronic device may determine whether to apply the changed setting value depending on the mode being executed on the foreground currently. Here, modes being executed on the foreground in the electronic device may be classified into the idle mode and an application execute mode. When the mode being executed on the foreground in the electronic device is the idle mode, the electronic device may store a changed at least one setting value and then apply the changed at least one setting value when executing the electronic device afterward. That is, when the electronic device has changed at least one setting value during execution of the idle mode, the electronic device may store the changed setting value.

In contrast, when determining the idle mode is not being executed on the foreground in the above determine process 905, the electronic device may determine whether an application being executed on the foreground ends at operation 907. More specifically, the electronic device may reflect the changed at least one setting value to execute the application being executed on the foreground, and then determine whether the application being executed on the foreground ends.

When determining the application being executed on the foreground ends, the electronic device may end the application without storing the changed setting value at operation 908. For example, in the case where the electronic device ends the application A and then executes the application A again, the electronic device does not apply the setting value changed while the previous application A is being executed. In the electronic device of the related art, in the case where the idle mode is being executed on the foreground or an arbitrary application is being executed on the foreground in the electronic device, the electronic device may change only one setting value at a time in order to change the setting value of the electronic device. Also, the changed setting value in the electronic device is applied to not only an application being executed on the foreground currently but also other applications after the executed application ends in the electronic device. Therefore, the electronic device of the related art has a problem of having to change a stored setting value every time depending on a neighboring environment under which an application is executed or the characteristic of each application. However, in the electronic device according to the present disclosure, in the case where a setting value is changed during execution of each application, the changed setting value of the electronic device is applied only during execution of the application and is not stored together with ending of the application being executed. Therefore, since the electronic device according to the present disclosure does not store a changed setting value together with ending of the application being executed, an inconvenience of having to newly change a setting value so that it is suitable for the characteristic of each application every time is removed.

Figure 10:
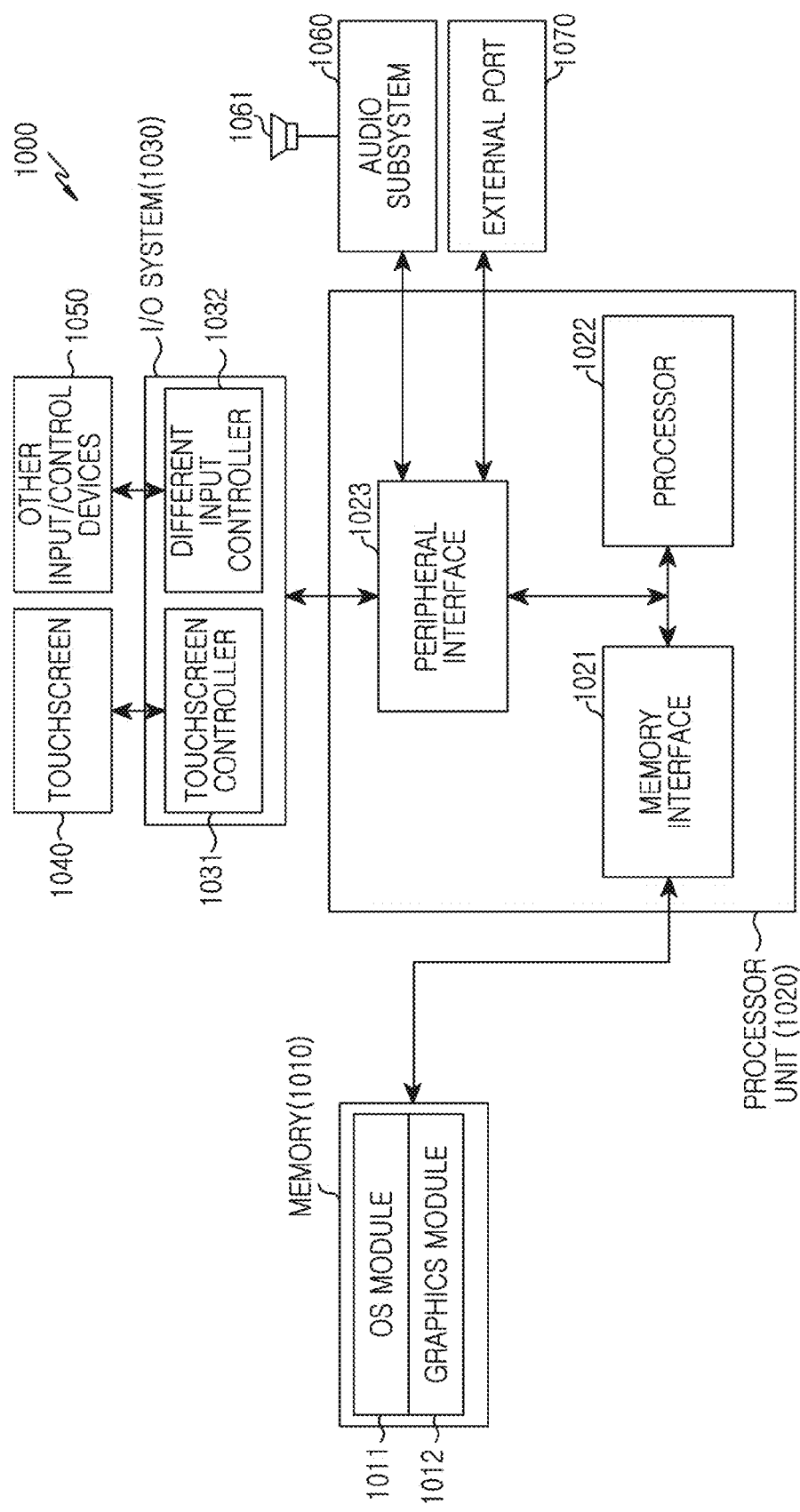
FIG. 10 is a block diagram illustrating an electronic device according to an embodiment of the present disclosure.

FIG. 10 is a block diagram illustrating an electronic device according to an embodiment of the present disclosure. The electronic device may be an apparatus like a portable electronic device, a portable terminal, a mobile phone, a mobile pad, a media player, a tablet computer, a handheld computer, or a Personal Digital Assistant (PDA). Also, the electronic device may be an arbitrary portable electronic device including an apparatus combining two or more functions among these apparatuses.

The electronic device 1000 may include a memory 1010, a processor unit 1020, an Input/Output (I/O) system 1030, a touchscreen 1040, other input/control devices 1050, an audio subsystem 1060, and an external port 1070.

The processor unit 1020 may include a memory interface 1021, one or more processors 1022, and a peripheral interface 1023. Depending on cases, the entire processor unit 1020 may be referred to as a processor. In the present disclosure, the processor unit 1020 detects a touch input for a set region, switches to a setting change mode for changing a stored setting value, and detects a predetermined gesture for an arbitrary region of a displayed guide interface to determine whether to store a changed at least one setting value. Also, the processor unit 1020 detects a touch input for a set region for a set time or more to switch to a setting change mode. Also, the processor unit 1020 analyzes a detected gesture to change at least one setting value among stored setting values so that it matches the detected gesture, and reflects the changed at least one setting value to change at least one operation state among a communication state, a volume state, and a screen state. Also, the processor unit 1020 determines an idle mode is being executed on the foreground, stores a changed at least one setting value, and ends the idle mode being executed on the foreground. Also, the processor unit 1020 executes one of the idle mode and stored at least one application on the foreground, and detects a stored setting value is reflected and at least one operation state among a communication state, a volume state, and a screen state has been changed. Also, the processor unit 1020 determines an arbitrary application is being executed on the foreground and ends execution of the application without storing a changed at least one setting value. Also, the processor unit 1020 executes one of the idle mode and stored at least one application on the foreground and detects a setting value before change is reflected and at least one operation state among a communication state, a volume state, and a screen state has not been changed. Also, the processor unit 1020 detects data information of at least one application has been stored by a set capacity or more, and when determining an application whose data information has been stored by the set capacity or more is being executed on the foreground, the processor unit 1020 applies a setting value reflecting the stored data information. Also, the processor unit 1020 reflects at least one data information among an execution time of an application whose data information has been stored by the set capacity or more, GPS information, and a battery capacity to apply a setting value.

The processor 1022 executes various software programs to perform various functions for the electronic device 1000, and performs a process and a control for voice communication and data communication. Also, in addition to the general functions, the processor 1022 also executes a specific software module (instruction set) stored in the memory 1010 to perform various specific programs corresponding to the module. That is, the processor 1022 performs the method of the embodiment of the present disclosure in cooperation with software modules stored in the memory 1010.

The processor 1022 may include one or more data processors, an image processor, or a CODEC. The data processor, the image processor, or the CODEC may be configured separately. Also, various processors performing different functions may be configured. The peripheral interface 1023 connects the I/O system 1030 of the electronic device 1000 to the memory 1010 (via a memory interface).

The various elements of the electronic device 1000 may be coupled by one or more communication buses (reference numeral not shown) or stream lines (reference numeral not shown).

An external port 1070 is used for directly connecting a portable electronic device (not shown) to other electronic devices or indirectly connecting the portable electronic device to other electronic devices via a network (for example, the Internet, an intranet, a wireless Local Area Network (LAN), etc.). Though not limited thereto, the external port 1070 denotes a Universal Serial Bus (USB) port or a FIREWIRE port, etc., for example.

The audio subsystem 1060 may be coupled to a speaker 1061 to take charge of voice recognition, voice duplication, digital recording, and an input and an output of an audio stream such as a telephone function. That is, the audio subsystem 1060 communicates with a user via a speaker 1061. The audio subsystem 1060 receives a data stream via the peripheral interface 1023, and converts a received data stream to an electric stream. The converted electric stream is transferred to the speaker 1061. The speaker 1061 converts an electric stream to a sound wave audible by a human being, and outputs the same. The audio subsystem 1060 converts a received electric stream to an audio data stream, and transmits the converted audio data stream to the peripheral interface 1023. The audio subsystem 1060 may include an attachable and detachable ear phone, a head phone or a headset.

The I/O system 1030 may include a touchscreen controller 1031 and/or a different input controller 1032. The touchscreen controller 1031 may be coupled to the touchscreen 1040. Though not limited thereto, the touchscreen 1040 and the touchscreen controller 1032 may detect a contact, a movement, or stoppage of these using an arbitrary multi-touch detection technology including not only capacitive, resistive, infrared, and surface acoustic wave technologies for determining one or more contact points with the touchscreen 1040 but also other proximity sensor arrangements or other elements. The different input controller 1032 may be coupled to the other input/control devices 1050. Other input/control devices 1050 may be one or more buttons, a rocker switch, a thumb-wheel, a dial, a stick, and/or a pointer device such as a stylus.

The touchscreen 1040 provides an input/output interface between the electronic device 1000 and a user. That is, the touchscreen transfers the user's touch input to the electronic device 1000. Also, the touchscreen is a medium for showing an output from the electronic device to the user. That is, the touchscreen 1040 shows a visual output to the user. This visual output is represented in the form of text, graphics, a video, and a combination of these.

For the touchscreen 1040, various displays may be used. For example, though not limited thereto, a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED) may be used.

The memory 1010 may be coupled to the memory interface 1021. The memory 1010 may include a high speed random access memory like one or more magnetic disk storage device and/or a non-volatile memory, one or more optical storage device and/or a flash memory (for example, NAND, NOR).

The memory 1010 stores a software. A software element includes an Operating System (OS) module 1011 and a graphics module 1012. Also, since a module which is a software element may be expressed as a set of instructions, the module may be also expressed as an instruction set. The module is also expressed as a program. The memory 1010 of the present disclosure discriminates each application among stored one or more applications to store data information.

The OS software 1011 (for example, WINDOWS, LINUX, Darwin, RTXC, UNIX, OS X, or a built-in OS like VxWorks) includes various software elements for controlling the general system operation. The control of the general system operation denotes, for example, memory management and control, storage hardware (device) control and management, power control and management, etc. The OS software also performs a function for swift communication between various hardwares (devices) and software elements (modules).

The graphics module 1012 includes various software elements for providing and displaying graphics on the touchscreen 1040. A terminology of graphics is used to denote text, a web page, an icon, a digital image, a video, an animation, etc. In the present disclosure, the touchscreen 1040 displays at least one guide interface for receiving an input of a change of at least one setting value among stored setting values, receives an input of the end of the idle mode being executed on the foreground, and receives an input of the end of an application being executed on the foreground.

FIGS. 11A to 11D are views illustrating an embodiment of selecting one of devices accessible via Bluetooth according to the present invention.

Figure 11A:
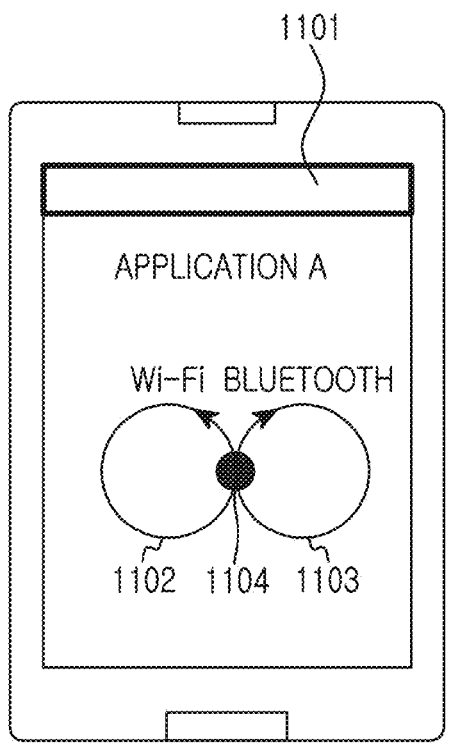
FIGS. 11A to 11D are views illustrating an embodiment of selecting one of devices accessible via Bluetooth according to an embodiment of the present invention.
Figure 11B:
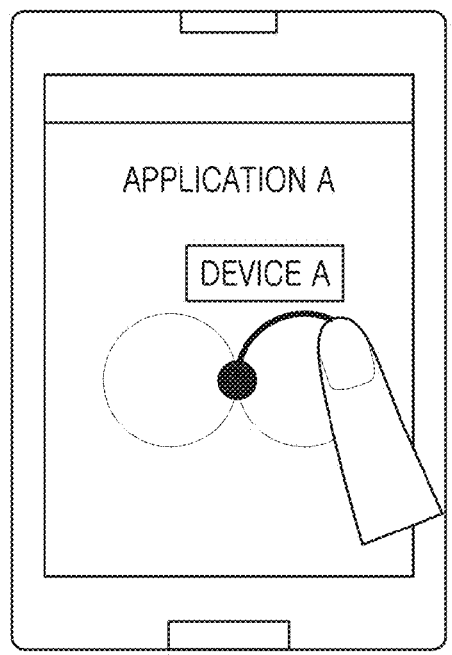
Figure 11C:
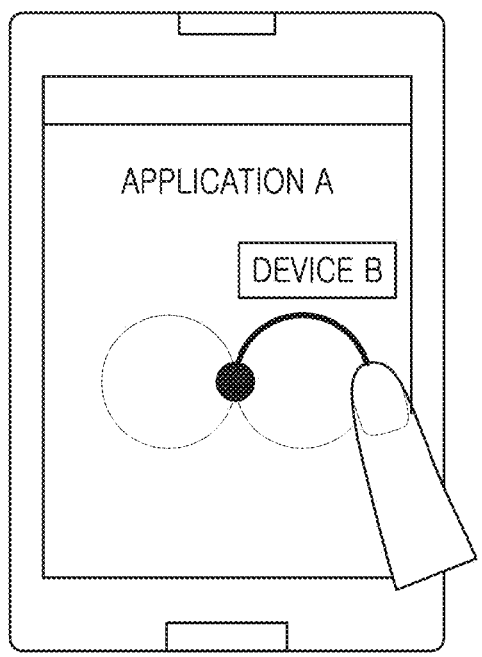
Figure 11D:
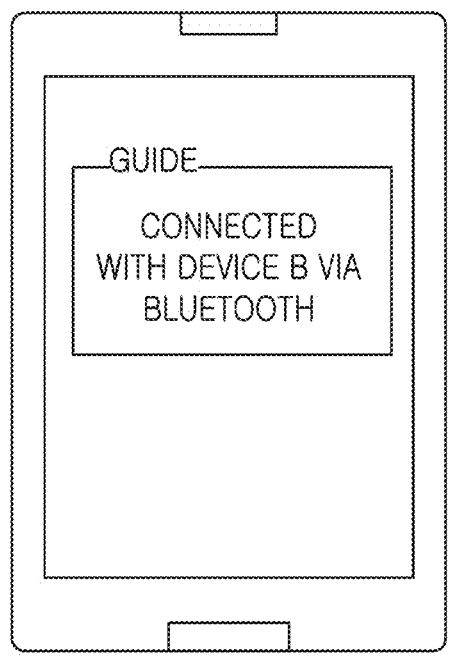

Referring to FIGS. 11A to 11D, the electronic device that executes an application A on the foreground may detect a touch input for the indicator area 1101 which is a set area for a set time or more to switch to the setting change mode that may change at least one setting value stored in the electronic device. More specifically, the electronic device may detect a touch input for the indicator area 1101 for a set time or more to display one or more guide interfaces 1102 and 1103 on the touchscreen. As illustrated in FIG. 11A, the electronic device may display a list of Access Points (APs) accessible via Wi-Fi or a list of set devices accessible via Bluetooth in the clockwise direction or the counterclockwise direction from a central region 1104 set in an arbitrary region of the touchscreen, respectively. In the present embodiment, the electronic device may display the guide interface 1102 that allows the electronic device to select one of the APs accessible via Wi-Fi, and the guide interface 1103 that allows the electronic device to select one of the set devices accessible via Bluetooth. That is, the left guide interface 1102 among the guide interfaces 1102 and 1103 displayed on the touchscreen of the electronic device allows the electronic device to select an AP accessible via Wi-Fi, and the right guide interface 1103 allows the electronic device to select a device accessible via Bluetooth. For example, the electronic device may receive a touch input for the set central region 1104 of the guide interface 1103 displayed on the right of the touchscreen, and then detect a drag operation in the clockwise direction or the counterclockwise direction to select one of the set devices accessible via Bluetooth. That is, the electronic device may receive the touch input for the set central region 1104, and as illustrated in FIGS. 11B and 11C, detect a drag operation in the clockwise direction to display a list of set devices connectable via Bluetooth. More specifically, as illustrated in FIG. 11B, when detecting an area corresponding to one fourth of the guide interface 1103 is dragged, the electronic device may display a device list of "device A" which is one of the set devices. After that, as illustrated in FIG. 11C, when detecting an area corresponding to two fourth of the guide interface 1103 is continuously dragged, the electronic device may display a device list of "device B" which is one of the set devices. When detecting the drag operation ends, the electronic device may automatically perform an access to a device corresponding to the device list currently displayed on the touchscreen via Bluetooth. After that, as illustrated in FIG. 11D, when detecting the drag ends with the device list of "device B" displayed on the touchscreen, the electronic device may display a guide message saying the electronic device has been automatically connected with the device B displayed on the current touchscreen via Bluetooth.

Also, the various functions of the electronic device 1200 mentioned above and to be mentioned below may be executed by one or more stream processings and/or a hardware including Application Specific Integrated Circuit (ASIC) and/or software and/or a combination of these.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   detecting a touch input for a set region to switch to a setting change mode for changing a stored setting value;
   displaying at least one guide interface for receiving a change of at least one setting value among stored setting values; and
   detecting a predetermined gesture for an arbitrary region of the displayed at least one guide interface to determine whether to store a changed at least one setting value,
   wherein the determining of whether to store the changed at least one setting value comprises:
      determining that an idle mode is being executed on a foreground;
      receiving a touch input for an end of the idle mode being executed on the foreground; and
      storing the changed at least one setting value, and then ending the idle mode being executed on the foreground.

2. The method of claim 1, wherein the set region is an indicator area on which at least one icon representing a current state is arranged.

3. The method of claim 1, wherein the detecting of the touch input for the set region to switch to the setting change mode for changing the stored setting value comprises:
   detecting the touch input for the set region for a set time or more; and
   detecting the touch input to switch to the setting change mode.

4. The method of claim 1, wherein, the at least one guide interface is a set shape for displaying that a drag is performed or that a touch is input in a first direction or a second direction from a set central region so that it controls one of the stored setting values.

5. The method of claim 1, further comprising:
   analyzing the detected gesture to change at least one of the stored setting values so that it matches the detected gesture; and
   reflecting the changed at least one setting value to change a system setting value.

6. The method of claim 1 further comprising:
   executing one of the idle mode and stored at least one application on the foreground; and
   detecting that the stored setting value has been reflected and that a system setting value has been changed.

7. The method of claim 1, wherein the determining of whether to store the changed at least one setting value comprises:
   determining that an arbitrary application is being executed on a foreground;
   receiving a touch input for an end of the application being executed on the foreground; and
   ending the execution of the application without storing the changed at least one setting value.

8. The method of claim 7, further comprising:
   executing one of an idle mode and stored at least one application on the foreground; and
   detecting a setting value before the change has been reflected and a system setting value has not changed.

9. The method of claim 1, further comprising:
   discriminating each application of a stored at least one application to store data information;
   detecting that the data information of the at least one application has been stored by a set capacity or more; and
   when determining that the application whose data information has been stored by the set capacity or more is being executed on a foreground, applying a setting value reflecting the stored data information.

10. The method of claim 9, wherein the applying of the setting value reflecting the stored data information comprises:
    reflecting at least one data information of an execution time of the application whose data information has been stored by the set capacity or more, Global Positioning System (GPS) information, and a battery capacity to apply the setting value.

11. An electronic device comprising:
    a touchscreen configured to display at least one guide interface for receiving a change of at least one setting value among stored setting values; and
    a processor unit configured to detect a touch input for a set region to switch to a setting change mode for changing the stored setting value, and to detect a predetermined gesture for an arbitrary region of the displayed at least one guide interface to determine whether to store a changed at least one setting value,
    wherein the touchscreen receives a touch input for an end of an idle mode being executed on a foreground, and
    wherein the processor unit determines that the idle mode is being executed on the foreground, stores the changed at least one setting value, and then ends the idle mode being executed on the foreground.

12. The electronic device of claim 11, wherein the set region comprises an indicator area on which at least one icon representing a current state is arranged.

13. The electronic device of claim 11, wherein the processor unit detects the touch input for the set region for a set time or more to switch to the setting change mode.

14. The electronic device of claim 11, wherein the at least one guide interface is a set shape for displaying that a drag is performed or that a touch is input in a first direction or a second direction from a set central region so that it controls one of the stored setting values.

15. The electronic device of claim 11, wherein the processor unit analyzes the detected gesture to change at least one of the stored setting values so that it matches the detected gesture, and reflects the changed at least one setting value to change a system setting value.

16. The electronic device of claim 11, wherein the processor unit executes one of the idle mode and stored at least one application on the foreground, and detects that the stored setting value has been reflected and a system setting value has been changed.

17. The electronic device of claim 11, wherein the touchscreen receives a touch input for an end of an arbitrary application being executed on a foreground, and the processor unit determines that the arbitrary application is being executed on a foreground, and ends the execution of the application without storing the changed at least one setting value.

18. The electronic device of claim 17, wherein the processor unit executes one of the idle mode and stored at least one application on the foreground, and detects a setting value before the change has been reflected and a system setting value has not changed.

19. The electronic device of claim 11, further comprising:

a memory for discriminating each application of a stored at least one application to store data information, wherein the processor unit detects that data information of the at least one application has been stored by a set capacity or more, and when determining that the application whose data information has been stored by the set capacity or more is being executed on a foreground, applies a setting value reflecting the stored data information.

20. The electronic device of claim 19, wherein the processor unit reflects at least one data information of an execution time of the application whose data information has been stored by the set capacity or more, Global Positioning System (GPS) information, and a battery capacity to apply the setting value.

* * * * *